US011484146B2

(12) United States Patent
Kawanobe

(10) Patent No.: US 11,484,146 B2
(45) Date of Patent: Nov. 1, 2022

(54) BEVERAGE EXTRACTION APPARATUS

(71) Applicant: Load&Road Inc., Tokyo (JP)

(72) Inventor: Kazunori Kawanobe, Tokyo (JP)

(73) Assignee: Load & Road Inc., Tokyo (JP)

( * ) Notice: Subject to any disclaimer, the term of this patent is extended or adjusted under 35 U.S.C. 154(b) by 152 days.

(21) Appl. No.: 16/500,321

(22) PCT Filed: Aug. 30, 2018

(86) PCT No.: PCT/JP2018/032274
§ 371 (c)(1),
(2) Date: Oct. 2, 2019

(87) PCT Pub. No.: WO2019/146145
PCT Pub. Date: Aug. 1, 2019

(65) Prior Publication Data
US 2021/0113011 A1 Apr. 22, 2021

(30) Foreign Application Priority Data
Jan. 29, 2018 (WO) .................. PCT/JP2018/002754

(51) Int. Cl.
*A47J 31/20* (2006.01)
*A47J 31/10* (2006.01)
(Continued)

(52) U.S. Cl.
CPC ........... *A47J 31/10* (2013.01); *A47J 31/0615* (2013.01); *A47J 31/20* (2013.01); *A47J 31/4407* (2013.01); *A47J 31/18* (2013.01)

(58) Field of Classification Search
CPC ........ A47J 31/18; A47J 31/20; A47J 31/0615; A47J 31/0621; A47J 31/0689; A47G 19/16
(Continued)

(56) References Cited

U.S. PATENT DOCUMENTS

2013/0055901 A1 3/2013 Zhang et al.
2014/0083301 A1 3/2014 Nakao et al.
(Continued)

FOREIGN PATENT DOCUMENTS

JP 2007098008 A 4/2007
JP 3199670 U 9/2015
(Continued)

OTHER PUBLICATIONS

International Search Report PCT/ISA/210 for International Application No. PCT/JP2018/032274 dated Nov. 8, 2018.

*Primary Examiner* — Reginald Alexander
(74) *Attorney, Agent, or Firm* — Harness, Dickey & Pierce, P.L.C.

(57) ABSTRACT

A beverage extraction apparatus of the present invention, comprises: a bottle portion capable of holding a liquid therein, which is supplied from an opening portion located at a top side thereof; a lid for covering the opening portion of the bottle portion; a base portion for allowing the bottle portion to be installed thereon and rotatably holding a base magnet therein; a motor for rotating the base magnet; an infuser for allowing an infuser magnet to be disposed therein and reversing itself upside down within the bottle portion along with rotation of the base magnet; and a controller for controlling a magnetic pole of the base magnet in order to allow or block inflow and outflow of the liquid with regard to an internal portion of the infuser and the bottle portion therein.

10 Claims, 18 Drawing Sheets

(51) Int. Cl.
*A47J 31/44* (2006.01)
*A47J 31/06* (2006.01)
*A47J 31/18* (2006.01)

(58) Field of Classification Search
USPC .................................................. 99/318, 323
See application file for complete search history.

(56) References Cited

U.S. PATENT DOCUMENTS

2016/0157662 A1   6/2016  Yang
2017/0119201 A1*  5/2017  Walker ................ A47J 43/0465
2018/0168385 A1*  6/2018  Boone ................ G06Q 30/0621
2018/0242775 A1*  8/2018  Lin .................... A47J 31/0636
2021/0106167 A1*  4/2021  Crozier ................ A47J 31/005

FOREIGN PATENT DOCUMENTS

WO   WO-2012098726 A1   7/2012
WO   WO-2014037733 A1   3/2014
WO   WO-2016205561 A2  12/2016

\* cited by examiner

| Tea's ID | Tea's name | Extraction time | Extraction temperature | Extraction physical quantity |
|---|---|---|---|---|
| CB0001 | Tea A | 5 Min. 30 Sec. | 80°C | 45rpm |
| CB0002 | Tea B | 10 Min. | 100°C | 70rpm |
| CB0003 | Tea C | 1 Min. 15 Sec. | 95°C | 60rpm |

BEVERAGE EXTRACTION APPARATUS

CROSS-REFERENCE TO RELATED APPLICATIONS

This application is a national phase under 35 U.S.C. § 371 of PCT International Application No. PCT/JP2018/032275 which has an International filing date of Aug. 30, 2018, which claims priority to International Application No. PCT/JP2018/002754, filed Jan. 29, 2018, the entire contents of each of which are hereby incorporated by reference.

TECHNICAL FIELD

The present invention relates to a beverage extraction apparatus.

BACKGROUND ART

Beverages such as tea and coffee require an extracting treatment. In such an extracting treatment, there exist the most appropriate extraction conditions, such as an extraction temperature, extraction time, etc., for tea leaves and coffee beans. Through setting-up such the most appropriate extraction conditions, the smell, flavor and taste of beverages via extracting, such as tea and coffee, become perfect. Because set-up of the most appropriate conditions requires skilled skills, it often requires a lot of experiences.

In order to obtain the extracted beverage under the most appropriate extraction conditions, even if the poor-experienced, a device for storing the extraction conditions and achieving an automatic extraction of the beverage has been developed. For example, Patent Document 1 discloses a tea beverage extraction device, which is capable of extracting a tea beverage with the most appropriate flavor and concentration, through executing an extraction process according to the most appropriate temperature of water and steaming time dependent on differences in types of tea leaves, sizes of tea leaves, and the like, via a manner of setting conditions in obedient to displaying contents displayed on a display unit of a main body.

CITATION LIST

Patent Literature

[Patent Literature 1] Japanese Patent Application Laid-Open No. 2007-098008

SUMMARY OF INVENTION

Technical Problem

However, since the tea beverage extraction device, as disclosed in the Patent Literature 1, is provided with an elevating mechanism, by which a net for tea leaves is lowered into an extraction container when the water temperature reaches an appropriate temperature and raised after the extraction process, a size of the beverage extraction device is thus increased. Further, since the elevating mechanism is configured to repeat elevating motions during the extraction of tea leaves, a large amount of electric power will be necessary during extraction.

Further, as disclosed in the Patent Literature 1, although the tea beverage extraction device can memorize the most appropriate extraction conditions corresponding to the types of tea leaves and the like in advance, there will be limitations of memorizing the extraction conditions, as well as it will not be applicable to new types of tea leaves and new combinations of tea leaves (blended one).

In view of the above, the present invention has been accomplished, and it is an object of the present invention to provide a beverage extraction apparatus which has a simple structure and is compact, a controlling method of the beverage extraction apparatus which can cope with various types or combinations of tea leaves and coffee beans, a controlling program of the beverage extraction apparatus and a memory medium.

Solution to Problem

In order to solve the above-mentioned problems, a beverage extraction apparatus of the present invention comprises a bottle portion capable of holding a liquid therein, which is supplied from an opening portion located at an upper side thereof, a lid for covering the opening portion of the bottle portion, a base portion for allowing the bottle portion to be installed thereon and rotatably holding a base magnet therein, a motor for rotating the base magnet, an infuser for allowing an infuser magnet to be disposed therein and reversing itself upside down within the bottle portion along with rotation of the base magnet, and a controller for controlling a magnetic pole of the base magnet in order to allow or block inflow and outflow of the liquid with regard to an internal portion of the infuser and the bottle portion therein.

Further, the base portion also can comprise a main body of the base portion for allowing the bottle portion to be installed thereon and an arm portion provided at an outer edge of the main body of the base portion in a standing manner, and the base magnet, which is disposed within the arm portion, also can be opposite to the infuser magnet.

Further, the infuser also can be in a substantially spherical shape, and the lid also can comprise a holder portion for rotatably holding the infuser, and at one of the infuser and the holder portion, a pair of rotation shafts also can be so configured that the pair of rotation shafts are extended in a horizontal direction and coaxial with each other.

Further, the pair of rotation shafts also can be configured at an outer surface of the infuser, and at the holder portion, insertion holes also can be configured in pair so as to allow the pair of rotation shafts to insert thereinto.

Further, the infuser magnets also can be disposed in either one of the pair of rotation shafts.

Further, the infuser also can comprise a first outer surface configured with a plurality of orifices so as to allow the inflow and outflow of the liquid with regard to the internal portion of the infuser and the bottle portion therein and a second outer surface for blocking the inflow and outflow of the liquid with regard to the internal portion of the infuser and the bottle portion therein, and the controller also can control the magnetic pole of the base magnet so as to allow the first outer surface to be in a downward manner, when allowing the inflow and outflow of the liquid with regard to the internal portion of the infuser and the bottle portion therein.

Further, the infuser also can comprise an inner plate located within internal portion of the infuser, for separating an inner side of the first outer surface from an inner side of the second outer surface.

Further, the bottle portion also can comprise a main bottle body in a cylindrical shape and a bottle handle protruding radially outward from the main bottle body, and the arm portion also can be disposed at an opposite side with respect to the bottle handle, both of which radially sandwich the main bottle body in a top view, within the outer edge of the main body of the base portion.

Further, the lid also can comprise a main lid body in a disk shape and a lid handle protruding radially outward from the main lid body, and the lid handle also can be not only circumferentially aligned with the bottle handle, but also both are vertically overlapped with each other.

Further, the infuser also can comprise a first outer surface configured with a plurality of orifices so as to allow the inflow and outflow of the liquid with regard to the internal portion of the infuser and the bottle portion therein and a second outer surface for blocking the inflow and outflow of the liquid with regard to the internal portion of the infuser and the bottle portion therein, and the controller also can control the magnetic pole of the base magnet so as to allow the first outer surface to be in an upward manner when allowing the inflow and outflow of the liquid with regard to the internal portion of the infuser and the bottle portion therein.

Further, the infuser also can be provided with a blocking mechanism for blocking the inflow and outflow of the liquid with regard to the bottle portion therein when the orifices are in a downward manner.

Further, the infuser magnet, which is comprised in the infuser, also can be located at an area of the first outer surface merely, and the controller also can control the magnetic pole of the base magnet, only when allowing the inflow and outflow of the liquid with regard to the internal portion of the infuser and the bottle portion therein.

Advantageous Effects of Invention

According to the present invention, once the temperature of water, as the liquid, reaches a temperature appropriate for extraction, the magnetic pole of the base magnet will be so controlled as to reverse a vertical position of the infuser and extraction of the beverage will be started, whereby a beverage extraction apparatus with a simple configuration can be achieved.

BRIEF DESCRIPTION OF DRAWINGS

FIG. 5 depicts an example of a data structure of the most appropriate extraction conditions of a plurality of tea leaves as memorized in a memory portion as illustrated in FIG. 1.

DESCRIPTION OF EMBODIMENTS

First Embodiment

Hereinafter, a beverage extraction apparatus, a controlling method of the beverage extraction apparatus, a controlling program of the beverage extraction apparatus and a memory medium according to the first embodiment of the present invention will be described in detail with reference to FIGS. 1 to 10. Further, in the present embodiment, an upper side is the upper side in a vertical direction, and a lower side is the lower side in the vertical direction.

Structure of Beverage Extraction Apparatus

Figure 1:
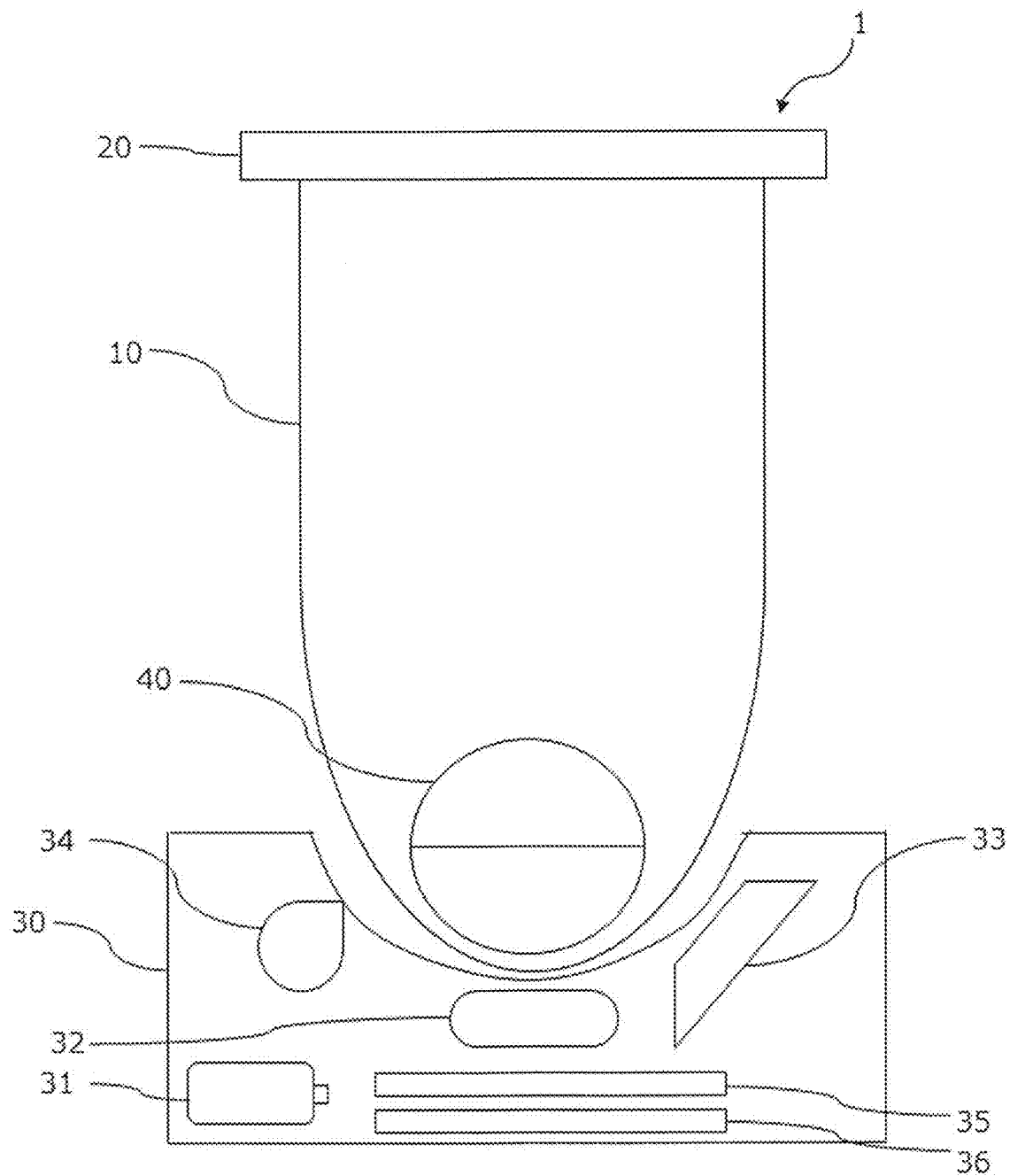
FIG. 1 is a schematic illustration illustrating a structure of a beverage extraction apparatus according to a first embodiment.

First of all, the structure of the beverage extraction apparatus 1 will be described with reference to FIG. 1. FIG. 1 is a schematic illustration illustrating a structure of a beverage extraction apparatus as described in the present embodiment.

As shown in FIG. 1, the beverage extraction apparatus 1 includes a bottle portion 10, a lid portion 20 capable of covering the bottle portion 10, a the base portion 30 for allowing the bottle portion 10 to be installed thereon and an infuser 40 immersed in the bottle portion 10.

Here, as the beverage which can be extracted by the extraction apparatus 1, tea or coffee is exemplified as a source to be extracted. However, the present invention is not limited to tea or coffee. Besides, water is usually used as a solvent which will become an extractive, but it is not particularly limited to the water as if the liquid is drinkable. Moreover, in the present embodiment, tea is exemplified as the source to be extracted and water as the extractive.

The bottle portion 10 is a cylindrical bottle and an upper surface thereof is open as an opening portion, so that water can be supplied from the opening portion and a liquid, such as water and so on, can be hold therein. A size of the bottle portion 10 is arbitrary, and it can be small for one person or large enough for using at a table. In the case of a small size for one person, the bottle portion 10 plays a role of a teapot during tea extraction and is used as a tea cup (glass) after tea extraction. Therefore, the uppermost portion of the bottle portion is formed in a brim shape suitable as a drinking lip. Moreover, a spout also can be formed at the uppermost portion of the bottle portion.

After extracting, the tea is usually at a high temperature, and it is thus possible to cover the side of the upper surface with a lid portion 20 for the purpose of keeping the temperature of the tea. The lid portion 20 need not be closed during tea extraction and can be left open so as to remove ingredients, such as chlorine, in the water.

An inner bottom surface (a lower side surface) of the bottle portion 10 is so configured as to be similar to the infuser 40 to be fitted. This is to facilitate the infuser 40 to rotate in multiple directions. The curved shape of the bottom surface of the bottle portion 10 can be gentler than the curved shape of the outer shape of the infuser 40 (see FIG. 1). A gap will be formed between the bottom surface of the bottle portion 10 and the infuser 40 when the curved shape of the bottom surface of the bottle portion 10 is gentler than the curved shape of the outer shape of the infuser 40, and the water in the bottle portion 10 will thus be easily brought into contact with the tea leaves in the infuser 40 and can facilitate convection of the water. Alternatively, the curved shape of the bottom surface of the bottle portion 10 is substantially the same as the curved shape of the outer shape of the infuser 40, the contact between the water in the bottle portion 10 and the tea leaf in the infuser 40 can thus be suppressed.

In the base portion 30, it comprises a power supply portion 31, a base magnet 32 driven by the power supply portion, a heater 33 heated by the power supply portion, a temperature sensor 34 for detecting temperature of the water in the bottle portion 10 heated by the heater 33, a controlling portion 35 and a memory portion 36.

Figure 8:
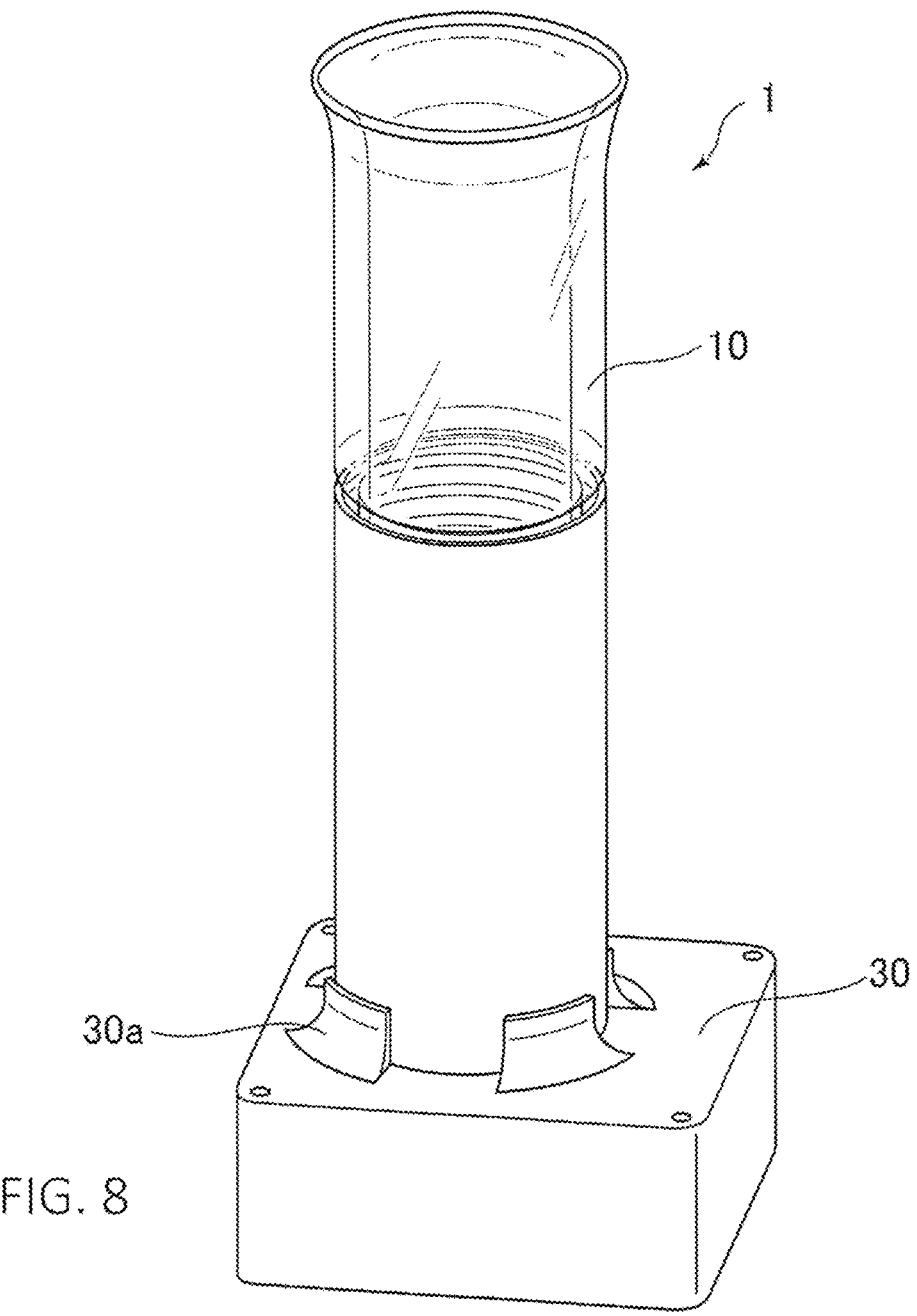
FIG. 8 is a perspective view of the beverage extraction apparatus as illustrated in FIG. 1.

The base portion 30 comprises, for example, a holding mechanism 30a as shown in FIG. 8 that holds the bottle portion 10 so as not to fall when installed. The holding mechanism 30a can be formed in such a shape that can be attached to a convex portion formed on the bottom surface of the bottle portion 10.

The power supply portion 31 appropriately transforms an alternating current from the outside and supplies the same to the base magnet 32, the heater 33, and the like. The power supply portion can be supplied by an external power supply, or can be a battery in which an electrical power is stored in advance. FIG. 1 depicts a case of the battery. When the power supply portion 31 is a battery, it will save effort due to unnecessity of plugging-in the beverage extraction apparatus to an external power supply each time. In the case that a battery is incorporated into the beverage brewing portion, the battery can be a primary battery or a secondary battery. Recently, it is also possible to charge the battery from a USB socket provided in a PC (personal computer) or the like, and a secondary battery is thus preferable. Moreover, a battery that can be supplied by electrical power in a wireless manner also can be used as the secondary battery.

The base magnet 32 is rotationally driven by a motor 55 (see FIG. 10), which is rotated by the power supplied from the power supply portion 31, and is held in the base portion 30. The base magnet 32 can be a permanent magnet or an electromagnet. In the present embodiment, a case of the electromagnet will be described.

The heater 33 is provided nearby the bottle portion 10, and used to heat up the water in the bottle portion 10. Further, the heater 33 is heated up via electrical power supplied from the power supply portion 31.

The temperature sensor 34, that is a sensor for detecting the water's temperature of the bottle portion 10, can be used to detect a nominal temperature of the bottle portion 10, or can directly detect the water temperature in the bottle portion 10. The temperature sensor 34 can also detect an abnormal rise in temperature (such as No-water heating) of the bottle portion 10, and the temperature sensor 34 can also function as a safety device.

The controlling portion 35 is driven by the power supply portion 31 and controls the base magnet 32, based on the information from the temperature sensor 34 and the input information from the user described later, the motor 55, that rotationally drives the base magnet 32, or the heater 33. Here, via a controlling manner of simply rotatably driving the base magnet 32 and a manner of controlling a magnetic pole of the base magnet 32, it is possible for the controlling portion 35 to execute a controlling manner of reversing the infuser 40 upside down. The controlling portion 35 comprises one or more processors stored in the memory portion 36 and their peripheral circuits. The controlling portion 35 is, for example, a CPU (Central Processing Unit). The controlling portion 35 controls the base magnet 32 and the heater 33 by executing the program stored in the memory portion 36 in an appropriate procedure based on information inputted from the user. Moreover, the controlling portion 35 for controlling the magnetic pole of the base magnet 32 can be corresponded to a controller of the present invention. That is, in order to allow or block inflow and outflow of the water with regard to an internal portion of the infuser 40 and the bottle portion 10 therein, the controlling portion 35 controls the magnetic pole of the base magnet 32. Moreover, in the disclosure of the present invention, "control of magnetic pole" is directed to a process of supplying a current to the base magnet 32, or reversing the direction of the current and changing an orientation of the magnetic pole.

Further, in the case that the base magnet 32 is a permanent magnet, the controlling portion 35 executes a controlling manner of reversing the magnetic pole of the base magnet 32 to be opposite to the infuser 40 via reversing the base magnet 32 itself. In the present embodiment, although the controlling portion 35 controls the magnetic pole of the base magnet 32 via execution of an appropriate program, it is not only possible to executes a controlling manner of reversing the magnetic pole of the base magnet 32 via a mechanical mechanism, but also changing the orientation of the magnetic pole of the base magnet 32 via the mechanical mechanism.

In the present embodiment, although the controlling portion 35 or the memory portion 36 is provided within the base portion 30, it is also possible to provide the controlling portion 35 or the memory portion 36 outside the base portion 30. For example, as a controlling portion, a application program in the user's terminal can control the beverage extraction apparatus 1, as well as it is possible to control the beverage extraction apparatus 1 by transmitting a processing signal generated by the application program in a server to the beverage extraction apparatus 1 directly or via the user's terminal. In addition, since it is unnecessary to unify the controlling portion 35 in one device, it is thus possible to divide and allocate it in several devices. For example, a portion thereof can be existed in the base portion 30, and the other portion thereof can be existed in the user's terminal. Here, user's terminal is directed to a terminal used by the user, and is, for example, a smartphone, a mobile phone, a tablet PC (Personal Computer), a notebook PC, a desktop PC, or the like.

The memory portion 36 comprises, for example, at least one of a semiconductor memory, a magnetic disk drive, and an optical disk drive. The memory portion 36 memorizes an operating system program, a driver program, an application program, data, and the like that are used in processing of the control unit 35.

Figure 2:
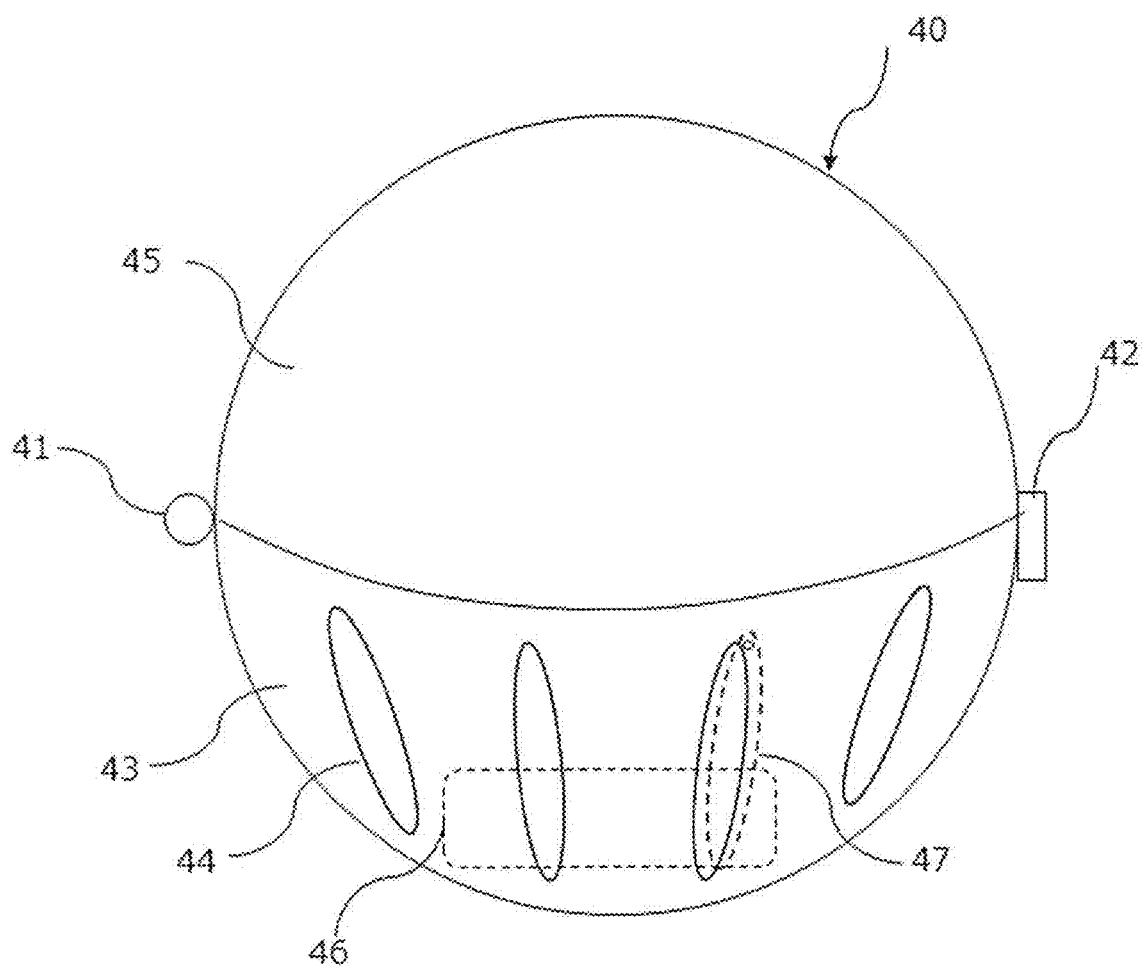
FIG. 2 is a perspective view of the infuser as illustrated in FIG. 1.
Figure 6:
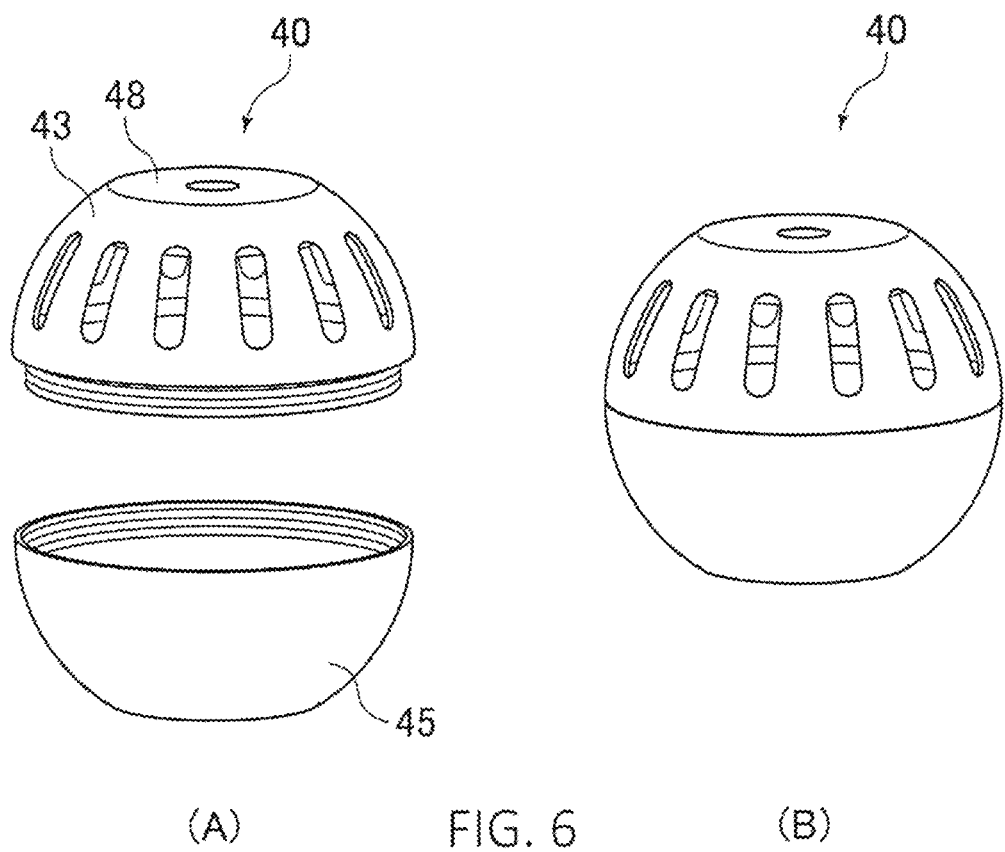
FIG. 6 illustrates a modified example of the infuser as illustrated in FIG. 1, in which (A) illustrates the configuration in an opened manner and (B) illustrates the configuration in a coupled manner.
Figure 9:
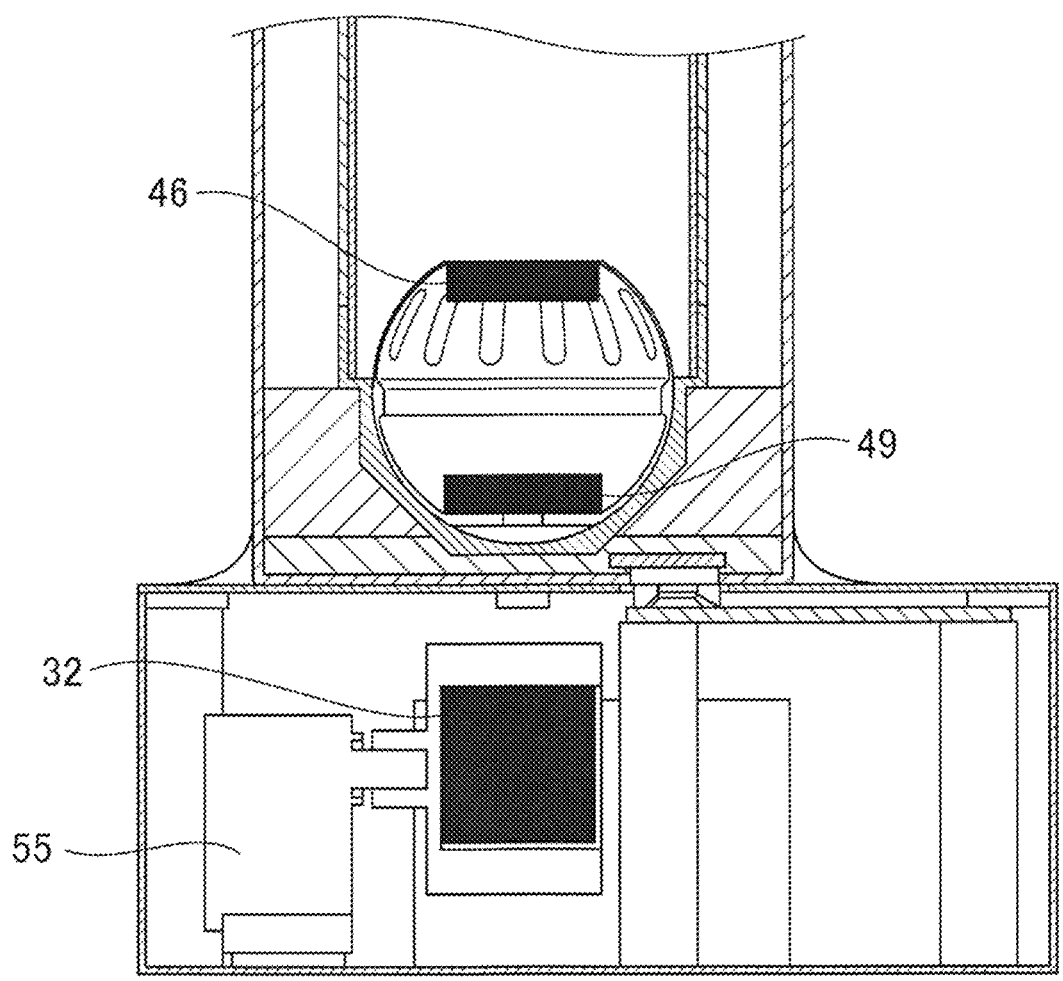
FIG. 9 illustrates an example of a cross-sectional view of a detailed structure of a base magnet of the beverage extraction apparatus as illustrated in FIG. 1.
Figure 10:
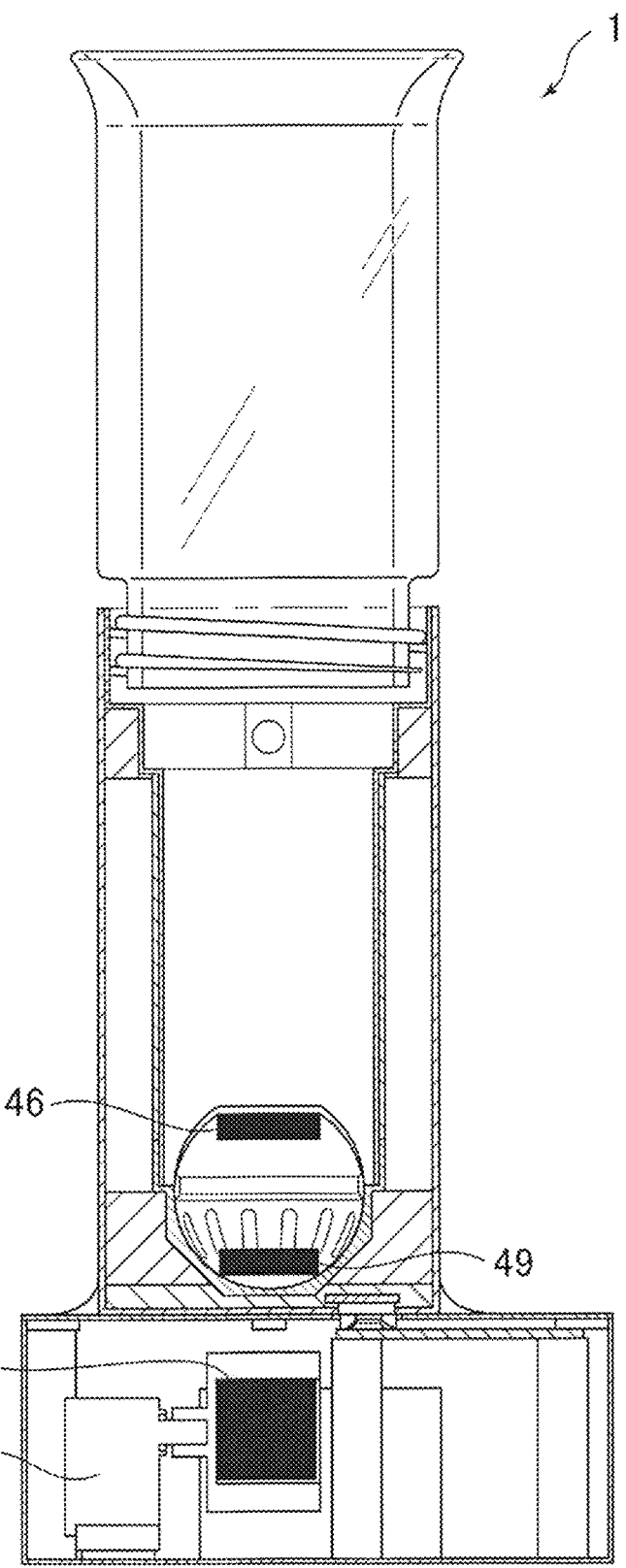
FIG. 10 illustrates an example of a cross-sectional view of the beverage extraction apparatus as illustrated in FIG. 1.

FIG. 2 is a perspective view of the infuser 40 according to the present embodiment. The infuser 40 is provided with, as shown in FIG. 2, a hinge portion 41, a lock portion 42, an outer surface of one half of the sphere (hereinafter referred to as a first outer surface) 43, a plurality of orifices 44, an outer surface of the other half of the sphere (hereinafter referred to as a second outer surface) 45 and the infuser magnet 46. Moreover, although the infuser 40 as shown in FIG. 2 is described, in the present embodiment, the infuser can be one as shown in FIG. 6. Further, as shown in FIG. 9, the infuser magnets 46 and 49 can be configured to be attached to the first outer surface and the second outer surface, respectively.

Figure 7:
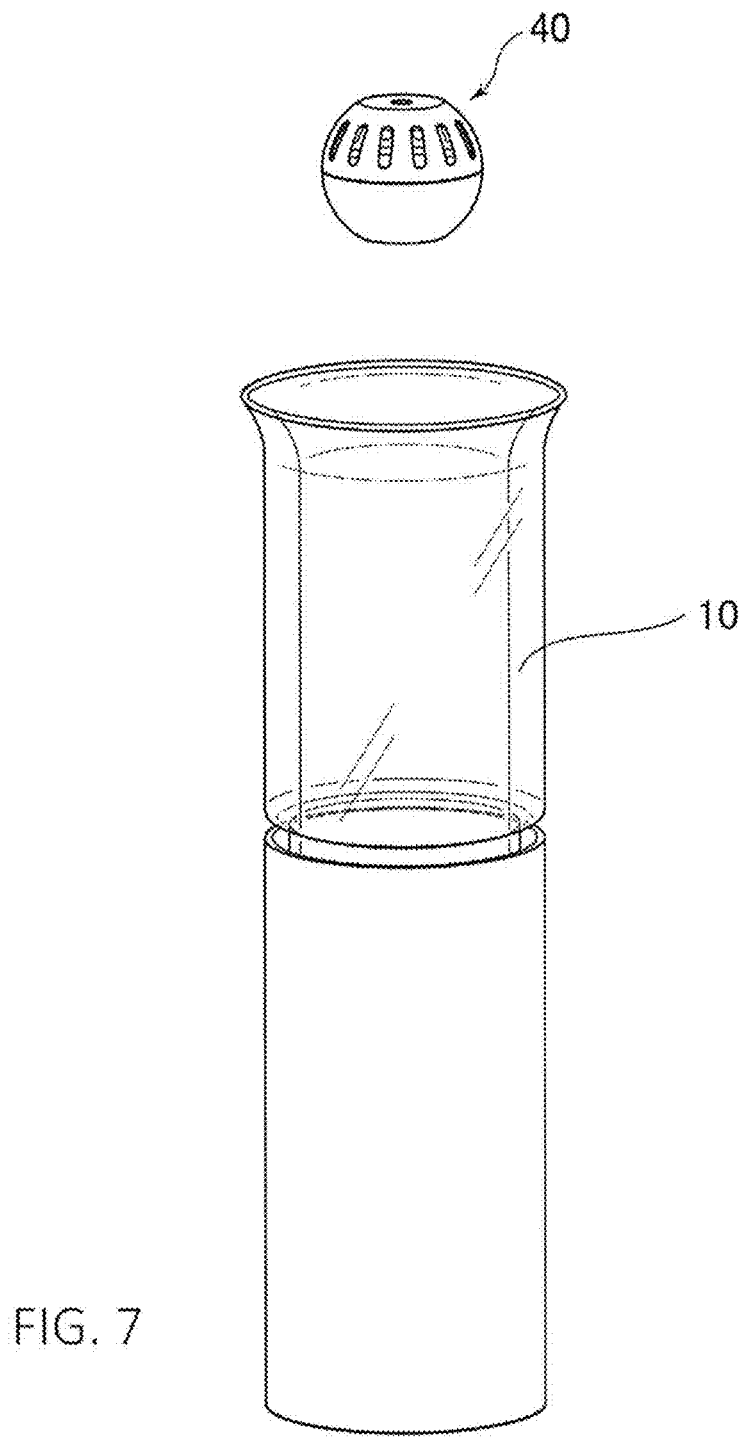
FIG. 7 illustrates an example of the structure of the beverage extraction apparatus and the infuser as illustrated in FIG. 1.

The infuser 40 has, as shown in FIG. 2, a spherical shape. It is unnecessary to limit the shape of the infuser 40 to be a sphere, and can be a box. The infuser 40 is, as shown in FIG. 7, immersed in the bottle portion 10 via the opening portion, and comes in contact with the water or heated water so as to allow the tea to be extracted. Further, the infuser 40 has a hollow structure capable of enclosing mouth tea leaves inside, and a variety of tea leaves or a combination thereof can be enclosed depending on the of the user's preference. For example, as shown in FIG. 6(A), helical grooves are provided on the first outer surface and the second outer surface of the infuser 40 so as to allow to be opened and be engaged. Further, as shown in FIG. 2, the hinge portion 41 and the lock portion 42 can be provided as a mechanism for opening the infuser 40 in order to enclose the tea leaves. Such a mechanism is not limited to the hinge portion 41 and the lock portion 42, and, as if one half of the sphere and the other half of the sphere may be completely separated, a screw lock mechanism also can be provided on the separated cross section.

The infuser 40 is provided with a first outer surface 43 configured with a plurality of orifice portions 44 in order to allow the inflow and outflow of a liquid with regard to the internal portion of the infuser 40 and the bottle portion 10 therein, and a second outer surface 45 without irregularities or orifices. The first outer surface of the infuser 40 will be in an upward manner when allowing the inflow and outflow of the liquid with regard to the internal portion thereof and the bottle portion 10 therein, and the second outer surface of the infuser 40 will be in an upward manner when blocking the inflow and outflow of the liquid with regard to the internal portion thereof and the bottle portion 10 therein. Further, in a case of the infuser 40 as shown in FIG. 6, the first outer surface 43 will be configured with a plurality of orifice portions 44 in order to allow the inflow and outflow of a liquid with regard to the internal portion of the infuser 40 and the bottle portion 10 therein, and the second outer surface 45 will not be provided with a orifice 48 thereon.

In the present embodiment, a ratio of the first outer surface 43 and the second outer surface 45 is halved, but this ratio can be appropriately modified. For example, it is possible to modify such a ratio according to a kind of tea leaf or the extraction conditions. Further, in the present embodiment, although the shapes of the orifice portions 44 are vertically long, as shown in FIG. 2, such shapes are also arbitrary and can be modified according to the kind of tea leaf. Furthermore, the orifice portions 44 can be provided with meshes so that fine tea leaves will not mix with the water.

The infuser 40 further comprises an infuser magnet 46 that is provided within a side of the first outer surface 43, and is rotatably driven along with a rotational driving of the base magnet 32 of the base portion 30. Here, the infuser magnet 46 is a permanent magnet and is disposed nearby a central portion of the first outer surface. At this time, the infuser magnet 46 is disposed in the infuser 40 such that one magnetic pole is disposed on the upper side and the other magnetic pole is disposed on the lower side. With such a configuration, since the infuser magnet 46 is disposed merely in the vicinity of the central portion of the first outer surface, the first outer surface side of the infuser 40 will be at the lower side due to gravity when the base magnet 32 does not generate a magnetic force. Then, when the magnetic force is generated in the base magnet 32, vertical positions of the infuser magnet 46 will be reversed and vertical directions of the infuser itself will thus be reversed. That is, only when allowing the inflow and outflow of the liquid with regard to the internal portion of the infuser 40 and the bottle portion 10 therein, it is just necessary for the control unit 35 to cause an occurrence of the magnetic pole in the base magnet 32. Further, as shown in FIG. 9, through disposing the infuser magnets on the first outer surface and the second outer surface, respectively, it will be possible to cause the vertical positions to be reversed repeatedly.

In addition, the infuser 40 includes a blocking mechanism 47 that shut off the plurality of orifice portions 44 so as to block the inflow and outflow of the water with regard to the internal portion of the infuser 40 and the bottle portion 10 therein. Such a blocking mechanism 47 is a mechanism which is shut off by gravity when the first outer surface side is in the downward manner, and it will allow the inflow and outflow of the water with regard to the internal portion of the infuser 40 and the bottle portion 10 therein when the side of the first outer surface is in the upward manner. In FIG. 2, the blocking mechanism 47 is realized by a plate-shaped lid which is slightly larger than the orifice portions 44 and rotatably supported at the side of the second outer surface 45 within the internal portion of the infuser 40 with respect to the orifice portions 44.

Operation of Beverage Extraction Apparatus

Figure 3:
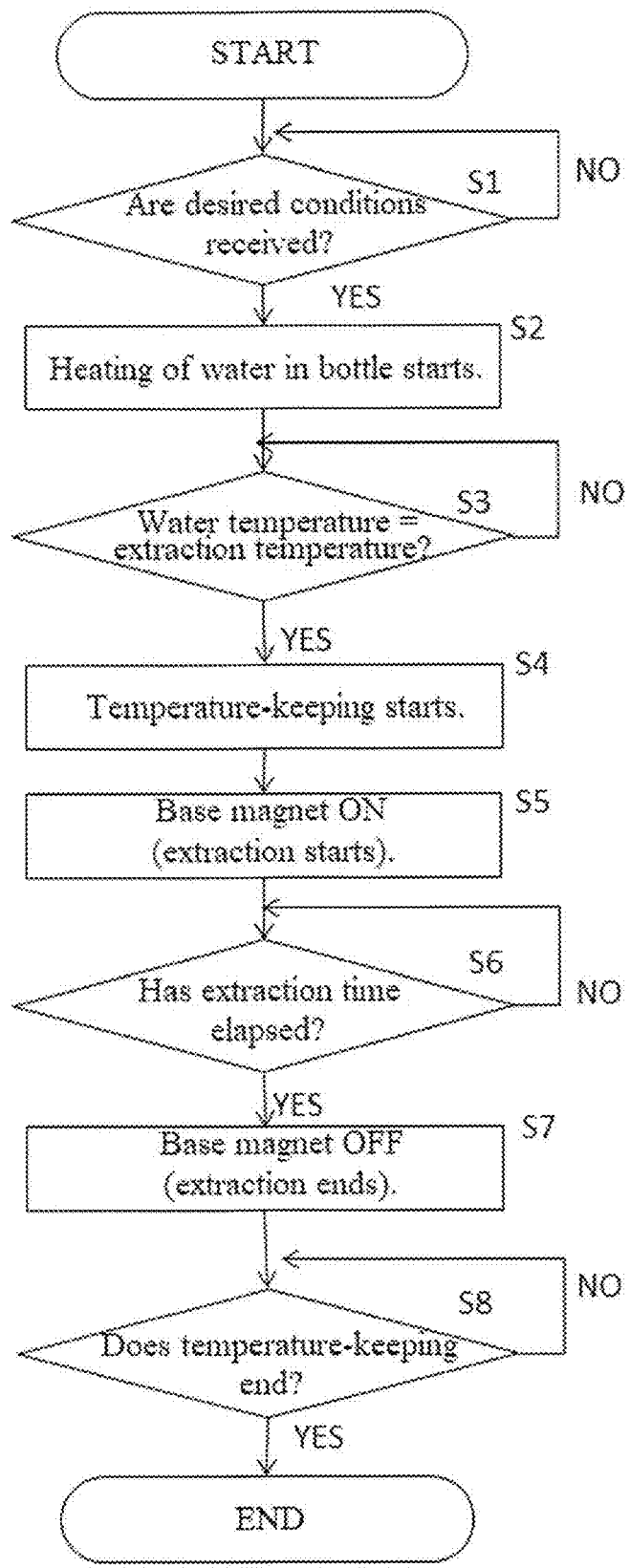
FIG. 3 is a flow chart which illustrates an extraction routine as an operation of the beverage extraction apparatus via controlling portion as illustrated in FIG. 1.

FIG. 3 is a flow chart which illustrates an extraction routine as an operation of the beverage extraction apparatus 1 via the controlling portion 35 according to the present embodiment. First of all, in S1, the controlling portion 35 waits for receiving desired extraction conditions from a user. The user can input the extraction conditions using an operation portion (not shown) provided in the base portion 30, or can input the extraction conditions using a terminal owned by the user himself/herself. The extraction conditions include extraction time, extraction temperature and extraction physical quantity. The extraction routine will be started once the extraction conditions are received from the user. The controlling portion 35 repeats the process of S1 until the user inputs desired extraction conditions (in the case that S1 is NO).

Once the desired extraction conditions are received from the user (in the case that S1 is YES), in S2, the controlling portion 35 starts by heating the water in the bottle portion 10 by utilizing the heater 33 so that the water becomes an extraction temperature included in the extraction conditions as received in S1. In S3, controlling portion 35 utilizes the temperature sensor 34 to keep the heater 33 in an ON state until the water temperature in the bottle portion 10 satisfies the extraction condition. That is, the controlling portion 35 repeats the process of S3 until the water temperature satisfies the extraction condition (in the case that S3 is NO). Then, when the water temperature reaches the extraction temperature included in the extraction conditions (in the case that S3 is YES), in S4, the controlling portion 35 controls the heater 33 so as to maintain the water temperature at the extraction temperature included in the extraction conditions. Specifically, besides the present extraction routine, the controlling portion 35 generates and transmits an extra start signal for executing an existing ordinary temperature-keeping routine.

Then, in S5, the power of the base magnet 32 is turned on by the controlling portion 35. When the power of the base magnet 32 is turned on, the base magnet 32 will generate a magnetic force and the current is so controlled that a side of the second outer surface 45 will be at a lower side. That is, the controlling portion 35 causes the base magnet 32 to generate the magnetic force, when allowing the inflow and outflow of the water with regard to the internal portion of the infuser 40 and the bottle portion 10 therein. In addition, in S5, the controlling portion 35 starts rotational driving of the base magnet 32. Additionally, the controlling portion 35 controls the rotating speed, as the extracted physical quantity, of the base magnet 32. In addition to the rotating speed of the base magnet 32, the extracted physical quantity can be controlling of a rotational position of the base magnet 32 and the strength of the power supply to the base magnet 32, and it is not particularly limited. In the present embodiment, the extraction physical quantity is the rotating speed, which is adjusted by the strength of the voltage transmitted from the controlling portion 35 to the base magnet 32. Further, the controlling portion 35 can also execute S4 and S5 simultaneously.

Moreover, the current can be supplied to the base magnet 32 when the extraction conditions are input. In this case, the control unit 35 can control the direction of electrical power to the base magnet 32 so as to generate the magnetic force such that the base magnet 32 will cause a side of the first outer surface 43 of the infuser 40 to be in a surely downward manner. In addition, the controlling portion 35 can start the rotational driving of the base magnet 32 when the extraction conditions are input. As a result, it is possible for the water temperature of the bottle portion 10 to become constant via stirring.

Then, in S6, the controlling portion 35 measures whether the extraction time included in the extraction conditions input by the user has elapsed a period of S4 to the present time or not. The controlling portion 35 repeats the process of S6 until the extraction time included in the extraction conditions has elapsed (in the case that S6 is NO). The controlling portion 35 executes the process of S7 when the extraction time included in the extraction conditions has elapsed (in the case that S6 is YES).

In S7, the controlling portion 35 stops energizing the base magnet 32 and also stops rotating the base magnet 32. Since ingredients, such as bitterness, will be extracted from the tea leaves due to continuously contacting with the water, the rotational driving of the base magnet 32 can be stopped in S7 and the magnetic pole of the base magnet 32 can be reversed. As a result, the contacting between the tea leaves and the water can be blocked since the first outer surface 43 is positioned at the lower side again. In addition, in S7, It is also possible to merely execute the reversing of the magnetic pole of the base magnet 32 and merely keep the rotational driving of the base magnet 32. Thus, the stirring of the extracted beverage can be continued.

Then, the process proceeds to S8, and the controlling portion 35 detects whether or not the user stops the process of keeping the water temperature in the bottle section 10 in S3. That is, the beverage extraction apparatus will stop when the user has drunk the extracted beverage up or has transferred the extracted beverage to another container. The process of S8 will be repeated until the user stops the temperature-keeping process (in the case that S8 is NO). Then, when the user stops the temperature-keeping process (in the case that S8 is YES), the controlling portion 35 ends the present extraction routine. Specifically, besides the present extraction routine, the controlling portion 35 generates and transmits an extra start signal for executing an existing ordinary temperature-keeping routine. Specifically, besides the present extraction routine, the controlling portion 35 generates and transmits an extra signal for stopping the existing temperature-keeping routine.

Controlling Method of Beverage Extraction Apparatus

Next, a method of controlling the beverage extraction apparatus based on the extraction conditions by the user will be described. In the present embodiment, a configuration, that the controlling portion 35 and the memory portion 36 are disposed within the base portion 30, is exemplified, the controlling portion 35 and the memory portion 36 also can be implemented by a user's terminal, an external server, or the like. Further, regarding the operation portion (not shown), although the configuration, that the operation portion is also disposed within the base portion 30, is exemplified in the present embodiment, the operation portion also can be a user's terminal owned by the user. When the user terminal is used as the controlling portion 35 or the operation portion, the user terminal and the beverage extracting apparatus 1 can communicate with each other via NFC (Near Field Communication) such as Bluetooth (registered trade mark), so that the user terminal and the beverage extracting apparatus 1 can be surely paired with each other.

Figure 4:
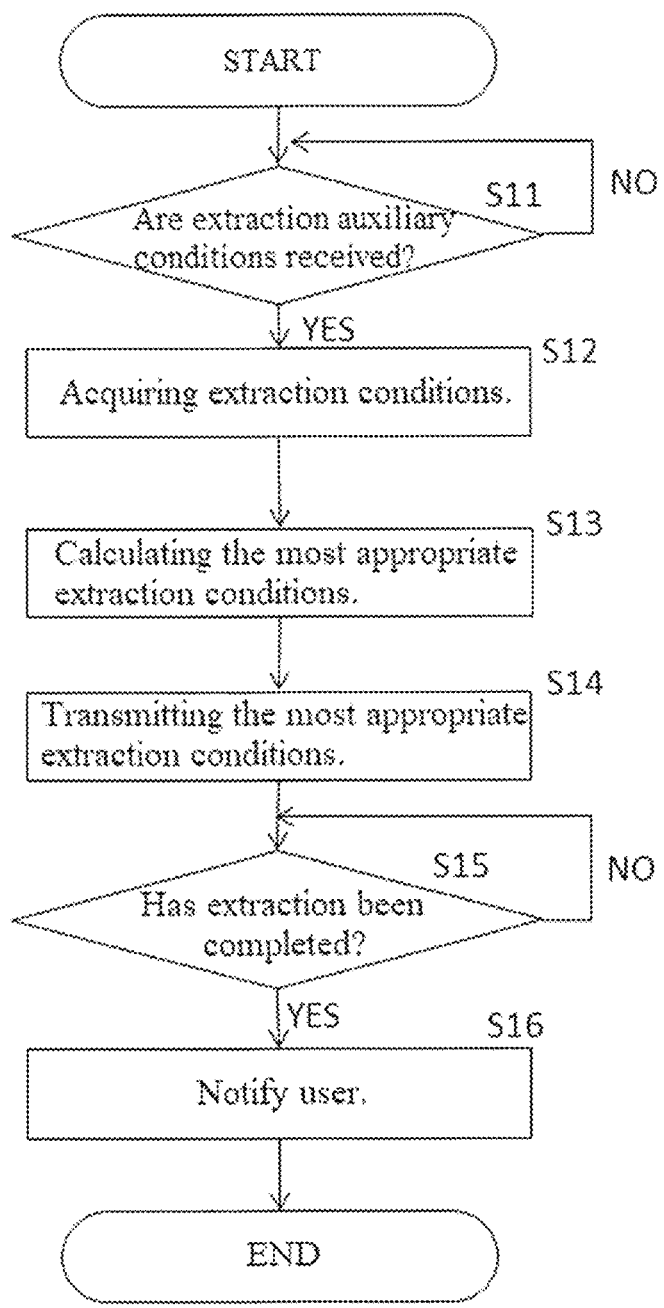
FIG. 4 is a flow chart which illustrates a controlling routine of the beverage extraction apparatus via controlling portion as illustrated in FIG. 1.

FIG. 4 is a flow chart which illustrates a controlling routine of the beverage extraction apparatus via the controlling portion 35 according to the present embodiment. First of all, in S11, the controlling portion 35 waits for receiving of the extraction auxiliary conditions from the user according to a kind of tea leaves, if necessary or the like. The user inputs the kind of tea leaves and the extraction auxiliary conditions as required by utilizing an operation portion. The control unit 35 repeats the process of S11 until the user inputs the extraction auxiliary conditions (in the case that S11 is NO).

Then, when the extraction auxiliary conditions are received from the user (in the case that S11 is YES), the controlling portion 35 acquires, from the memory portion 36, the extraction conditions, which at least includes the most appropriate extraction time, extraction temperature and extraction physical quantity with respect to the kind of tea leaves as input in S12.

FIG. 5 depicts an example of a data structure of the most appropriate extraction conditions of a plurality of tea leaves as memorized in a memory portion 36. As shown in FIG. 5, as the most appropriate extraction conditions of the plurality of tea leaves, the memory portion 36 memorizes the most appropriate extraction time, extraction temperature and extraction physical quantity with respect to each kind of tea leaves. Again, the extraction physical quantity may be directed to the number of rotations or a rotating speed of the infuser 40 to be filled. In the example as depicted in FIG. 5, "rpm" is used to represent number of rotations per minute. In addition, the memory portion also memorizes the extraction auxiliary conditions with respect to each kind of the plurality of tea leaves. The extraction auxiliary conditions are directed to auxiliary extraction conditions capable of obtaining or alleviating sourness, aroma, sweetness, bitterness, etc. of each kind of tea leaves.

In S13, the controlling portion 35 calculates the most appropriate extraction conditions by utilizing the extracted extraction conditions. Further, the memory portion 36 can memorize the extraction conditions and the extraction auxiliary conditions extracted by the user so far, and the controlling portion 35 can calculate the extraction conditions and the extraction auxiliary conditions according to the taste of the user with respect to each kind of tea leaves by the controlling portion 35. In a case that memory portion 36 is a server or the like connected with each other via an Internet network, since it is possible to memorize the extraction conditions of various users, so that the controlling portion 35 also can calculate the most appropriate extraction conditions for the tea leaves or the users by utilizing a huge database.

Further, the user also can extract a beverage by combining a plurality of tea leaves according to the user's preference. It is a so-called blend tea. The beverage extraction apparatus 1 also can calculate the extraction conditions and the extraction auxiliary conditions corresponding to combinations of a plurality of tea leaves. Specifically, the user inputs each percentage of each individual tea leaves included therein to the controlling portion 35 through the operation portion. Then, the controlling portion can calculate the extraction conditions or the extraction auxiliary conditions according to a combination of the plurality of tea leaves. In the present embodiment, although the control unit 35 not only calculates the extraction condition and the extraction auxiliary condition, but also controls the beverage extraction apparatus 1, in a case that such operation are executed by more than one controlling portions, it is possible to realize it by transmitting the extraction conditions and the extraction auxiliary condition calculated in one controlling portion to another controlling portion. Moreover, via the operation portion, each user can be able to post a recommended blend tea to, for example, the SNS.

Depending on the tea leaves, ingredients such as bitter will be extracted when an excessive extraction temperature, an excessive extraction time and an excessive extraction physical quantity are adopted. In a case that the user inputs a combination of a plurality of tea leaves, the controlling portion 35 will calculate, as the most appropriate extraction conditions, the shortest extraction time, the lowest extraction temperature, and the smallest extraction physical quantity, based on the extraction conditions extracted from the memory portion 36 with respect to the individual tea leaves. On the other hand, in a case that an extraction of all of active ingredients of a plurality of tea leaves is desired, the control unit 35 calculates, as the most appropriate extraction conditions, the maximum extraction time, the maximum extraction temperature and the maximum extraction physical quantity, based on the extraction conditions extracted from the memory portion 36 with respect to individual tea leaves.

Further, depending on the combination of tea leaves, it is probably to result in an ill-blended beverage and cause the user's stomachache or the like. Therefore, the memory portion 36 can memorize such a combination of the ill-blended tea leaves, and can warn the user if the user selects a plurality of the ill-blended tea leaves.

Continuously, in S14, the controlling portion 35 transmits the calculated most appropriate extraction conditions to the beverage extraction apparatus 1, and the beverage extraction apparatus 1 starts extraction of beverage.

Continuously, in S15, the controlling portion 35 determines whether or not the extraction process from the tea leaves has been completed. The controlling portion 35 repeats the process of S15 until the extraction process from the tea leaves is completed (in the case that S15 is NO). Then, when the extraction process from the tea leaves is completed (in the case that S15 is YES), the user is notified that the extraction process from the tea leaves is completed (S16). When S16 is completed, the controlling portion 35 ends the controlling routine.

It should be noted that the above-described various processes of the present embodiment can be executed by recording a program for realizing the functions of the controlling portion as described in the present embodiment in a computer readable recording medium, and allowing a computer system to read the program recorded in the recording medium and execute the program. Here, the so-called "computer system" may be directed to a computer system that includes an OS or hardware, such as peripheral devices. Further, in a case that the WWW system is used, the "computer system" is a computer system that additionally includes a homepage providing environment (or displaying environment). In addition, the "computer readable recording medium" is directed to a memory device, such as a flexible disk, a magneto-optical disk, ROM, a writable nonvolatile memory, for example, a flash memory, portable medium, for example, CD-ROM, a hard disk incorporated in the computer system, and so on.

First Modified Example

In the above-mentioned embodiment, the infuser 40 comprises one infuser magnet 46 therewithin, however, it is also possible to dispose one infuser magnet nearby a central portion of the first outer surface and another one infuser magnet nearby a central portion of the second outer surface. With such a configuration, a center of gravity of the infuser 40 can be moved toward the central portion, and the infuser 40 will smoothly reverse itself when the magnetic pole of the base magnet 32 is reversed. In such a case, it is necessary to arrange two magnets so that the upper sides of the two magnets are the same magnetic pole.

At this time, when the base magnet 32 is allowed to the magnetic force and inflow and outflow of the water with regard to the internal portion of the infuser 40 and the bottle portion 10 therein are thus allowed in S2, the controlling portion 35 will set the magnetic pole of the base magnet 32 located at a position opposite to the infuser 40 as a first pole. Then, when inflow and outflow of the liquid with regard to the internal portion of the infuser 40 and the bottle portion 10 therein are thus allowed in S5, the controlling portion 35 will set the magnetic pole of the base magnet 32 located at a position opposite to the infuser 40 as a second pole.

Second Modified Example

In the above-mentioned present embodiment and the first modified example, the infuser magnet is dispose nearby the central portion of the first outer surface and/or nearby a central portion of the second outer surface, however, it is also possible to dispose one or more rod-shaped infuser magnets on a side surface of the infuser 40, wherein the side surface is along with a vertical direction on which the infuser 40 is disposed. The rod-shaped infuser magnet is so disposed that the upper side is one magnetic pole and the lower side is the other magnetic pole. Since the process of the controlling portion 35 in this case is the same as that of the first modified example, the description thereof is omitted.

As described above, with the beverage extraction apparatus 1 according to the present embodiment, when the temperature of water, as a liquid, reaches a temperature suitable for extraction, the magnetic pole of the base magnet 32 is controlled and the vertical position of the infuser 40 is reversed, then extraction of the beverage will be started. Therefore, the beverage extracting apparatus 1 can be realized by a simple configuration.

Further, for example, even when a concentration of the liquid extracted from the tea leaves varies with the position in the vertical direction of the bottle portion 10, the liquid in the vertical direction of the bottle portion 10 can still be stirred via reversing the infuser 40 in an upside down manner. Thus, the function of the beverage extraction apparatus 1 can be improved.

Further, since the infuser 40 is in a substantially spherical shape and an inner bottom surface of the bottle portion 10 is in a shape of a vessel to which the infuser 40 fits, the bottom surface of the bottle portion 10 thus coincides with the spherical surface of the infuser 40, so that the infuser 40 can be easily rotated.

Further, since the controller controls the magnetic pole of the base magnet 32 such that the first outer surface 43 is in a upward manner when allowing inflow and outflow of the liquid with regard to the internal portion of the infuser 40 and the bottle portion 10 therein, the beverage extraction can be started by merely controlling the magnetic pole of the base magnet 32, and thus, the beverage extraction can be performed without a large-scale apparatus in an energy-saving manner.

Further, since the infuser 40 is provided with a blocking mechanism 47 for blocking inflow and outflow of the liquid with regard to the internal portion of the infuser 40 and the bottle portion 10 therein, when the orifices 44 in a downward manner, inflow and outflow of the liquid with regard to the internal portion of the infuser 40 and the bottle portion 10 therein can be surly blocked when the orifices 44 of the infuser 40 in the downward manner. Therefore, a dry status in the internal portion of the infuser 40 can be kept until the extraction of the beverage is started.

Further, in the case that the infuser 40 is merely provided with the infuser magnet 46 at the side of the first outer surface 43, it will be possible to reduce the weight of the infuser 40 itself and its cost as the infuser magnet 46 is merely provided at one side.

Further, in the case that the controller just controls the magnetic pole of the base magnet 32 only when allowing inflow and outflow of the liquid with regard to the internal portion of the infuser 40 and the bottle portion 10 therein, since the side of the first outer surface 43 will be in a downward manner due to gravity, thus, even if the base magnet 32 is not controlled, inflow and outflow of the liquid with regard to the internal portion of the infuser 40 and the bottle portion 10 therein will not be allowed until the extraction starts.

Further, since the controller causes the electromagnet to generate a magnetic force when allowing inflow and outflow of the liquid with regard to the internal portion of the infuser 40 and the bottle portion 10 therein, the electric power will be consumed only when allowing inflow and outflow of the liquid with regard to the internal portion of the infuser 40 and the bottle portion 10 therein, so that the consumed electrical power charge for extracting the beverage can be suppressed.

Further, the infuser 40 is provided with the infuser magnets 46 which are located at both sides of the first outer surface 43 and the second outer surface 45, and the infuser magnets 46 are so disposed that the respective upper sides thereof are the same one magnetic pole. Therefore, due to the infuser magnets 46, the center of gravity will move toward the central portion of the infuser 40, and thus, the upside down rotation of the infuser 40 will become smooth.

Further, the controller controls the magnetic pole of the base magnet 32 such that the first outer surface 43 will be in an upward manner when allowing inflow and outflow of the liquid with regard to the internal portion of the infuser 40 and the bottle portion 10 therein, as well as controls the magnetic pole of the base magnet 32 such that the second outer surface 45 will be in an upward manner when blocking inflow and outflow of the liquid with regard to the internal portion of the infuser 40 and the bottle portion 10 therein. Therefore, by appropriately controlling the magnetic pole of the base magnet 32, it is possible to rotate the infuser 40 while blocking inflow and outflow of the liquid with regard to the internal portion of the infuser 40 and the bottle portion 10 therein, so that the liquid in the bottle portion 10 can be stirred.

Further, since the infuser 40 comprises the rod-shaped permanent magnets, as the infuser magnets 46, which are disposed on the side surface of the infuser 40, wherein the side surface is along with the vertical direction on which the infuser 40 is disposed, due to the infuser magnets 46, the center of gravity will moves toward the central portion of the infuser 40, and thus, the upside down rotation of the infuser 40 will become smooth.

Further, the controller sets the magnetic pole of the base magnet 32 located at a position opposite to the infuser 40 as a first pole when allowing inflow and outflow of the liquid with regard to the internal portion of the infuser 40 and the bottle portion 10 therein, as well as sets the magnetic pole of the base magnet 32 located at a position opposite to the infuser 40 as a second pole when blocking inflow and outflow of the liquid with regard to the internal portion of the infuser 40 and the bottle portion 10 therein. Therefore, since the vertical direction of the infuser 40 can be controlled by merely controlling the magnetic pole of the base magnet 32, it is thus possible to easily allow or block inflow and outflow of the liquid with regard to the internal portion of the infuser 40 and the bottle portion 10 therein.

Further, a controlling method of beverage extraction apparatus 1 according to the present invention comprises a receiving step of receiving input contents by the user, an acquiring step of acquiring the extraction conditions from the memory portion 36 that at least comprises the most appropriate extraction time, extraction temperature and extraction physical quantity included in contents, a transmitting step of transmitting the acquired extraction conditions to the controlling portion 35 for controlling the extraction apparatus and a notifying step of notifying the user that the extraction process has been completed resulted from the contents.

In this case, since the most appropriate extraction conditions included in the contents as input by the user are acquired from the memory portion 36, the most appropriate extraction conditions included in the various contents can be realized in the beverage extraction apparatus 1.

Further, the extraction physical quantity is the number of rotations or the rotating speed of the infuser 40 that is filled with the contents of the extraction apparatus.

In this case, since it is possible to determine if the extraction step is carried out slowly or quickly depending on the contents, the beverage can be extracted based on the most appropriate extraction conditions.

In a case that a plurality of types of contents are received from the user in the receiving step, the acquiring step can acquire extraction conditions including at least the most appropriate extraction time, the extraction temperature and the extraction physical quantity with respect to individual one of each type of the plurality of types of contents from the memory portion 36, and further comprises a calculating step of calculating the most appropriate extraction conditions, as the most appropriate extraction conditions including the most appropriate extraction time, the extraction temperature and the extraction physical quantity, from the extracted individual extraction conditions based on the plurality of types of contents receiving from the user.

In this case, since the most appropriate extraction conditions corresponding to the original blend as input by the user can be calculated with reference of the memory portion 36 into consideration, the user can obtain the extracted beverage from the original blend without any effort.

Further, in the calculating step, for each type of the contents, the shortest extraction time, the lowest extraction temperature and the smallest extraction physical quantity are calculated as the most appropriate extraction conditions.

In this case, a calculating portion can calculate the appropriate extraction conditions corresponding to the original blend by a simple calculating method.

Further, in the calculating step, it further comprises a warning step of warning the user when it is calculated that the individual ones of the plurality of types of contents are ill-blended with each other.

In this case, the extraction of the original blend which may affect the user can be suppressed, or the drinking of the extracted beverage can be suppressed.

Further, the receiving step also can receive preference information of the user from the user, and the calculating step also can calculate extraction conditions based on the preference information of the user.

Further, since the most appropriate extraction condition for the user can be calculated based on the preference information of the user, the most appropriate beverage for the user can be extracted without specifying the detailed extraction conditions by the user.

Further, a controlling program of the beverage extraction apparatus 1 according to the present invention, it can allow a computer to realize a receiving function of receiving input contents by the user, an acquiring function of acquiring the extraction conditions from the memory portion 36 that at least comprises the most appropriate extraction time, extraction temperature and extraction physical quantity included in contents, a transmitting function of transmitting the acquired extraction conditions to the controlling portion 35 for controlling the extraction apparatus and a notifying function of notifying the user that the extraction process has been completed resulted from the contents.

In this case, since the most appropriate extraction conditions included in the contents as input by the user are acquired from the memory portion 36, the most appropriate extraction conditions included in the various contents can be realized in the beverage extraction apparatus 1.

Further, a memory medium according to an aspect of the present invention stores the controlling program of the beverage extraction apparatus 1 according to the above-mentioned aspect.

Second Embodiment

Hereinafter, a beverage extraction apparatus 2 according to the second embodiment of the present invention will be described with reference to FIGS. 11 to 18. Moreover, in this description, the same configuration and controlling method as those of the first embodiment will not be described. A description of the same effects as those of the first embodiment is also omitted.

Figure 11:
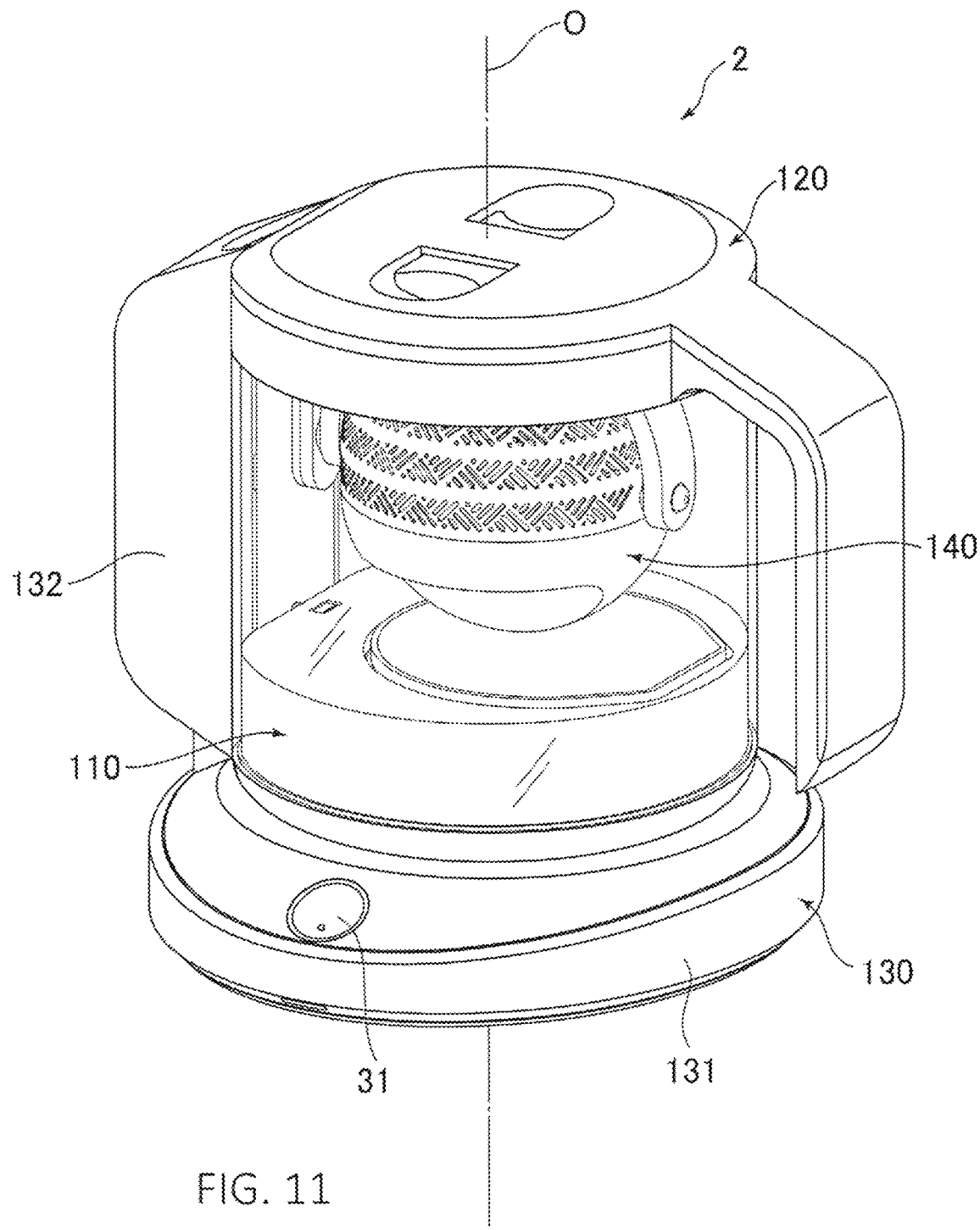
FIG. 11 is a perspective view of the beverage extraction apparatus according to a second embodiment.
Figure 12:
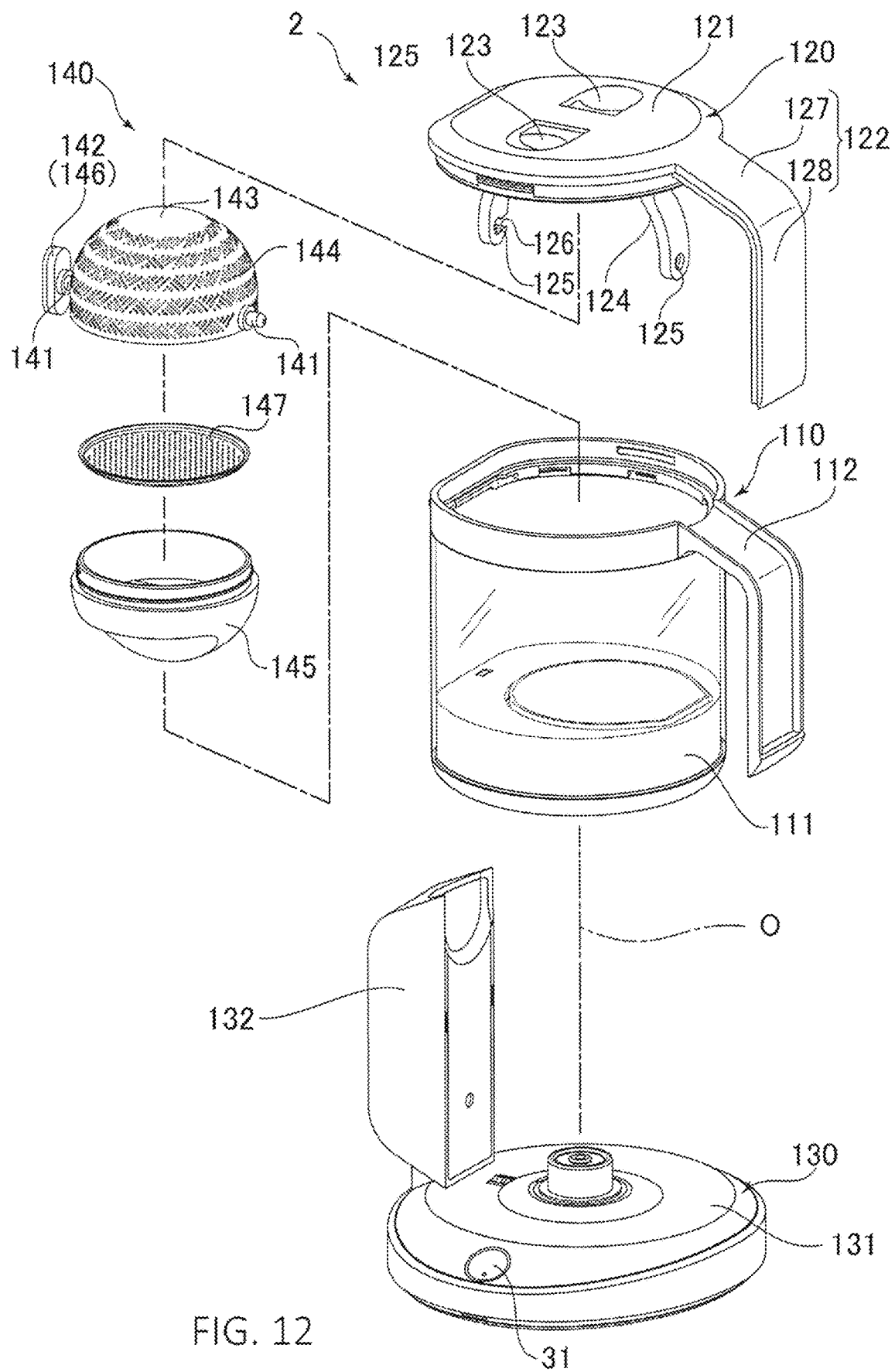
FIG. 12 is an exploded perspective view of the beverage extraction apparatus as illustrated in FIG. 11.
Figure 13:
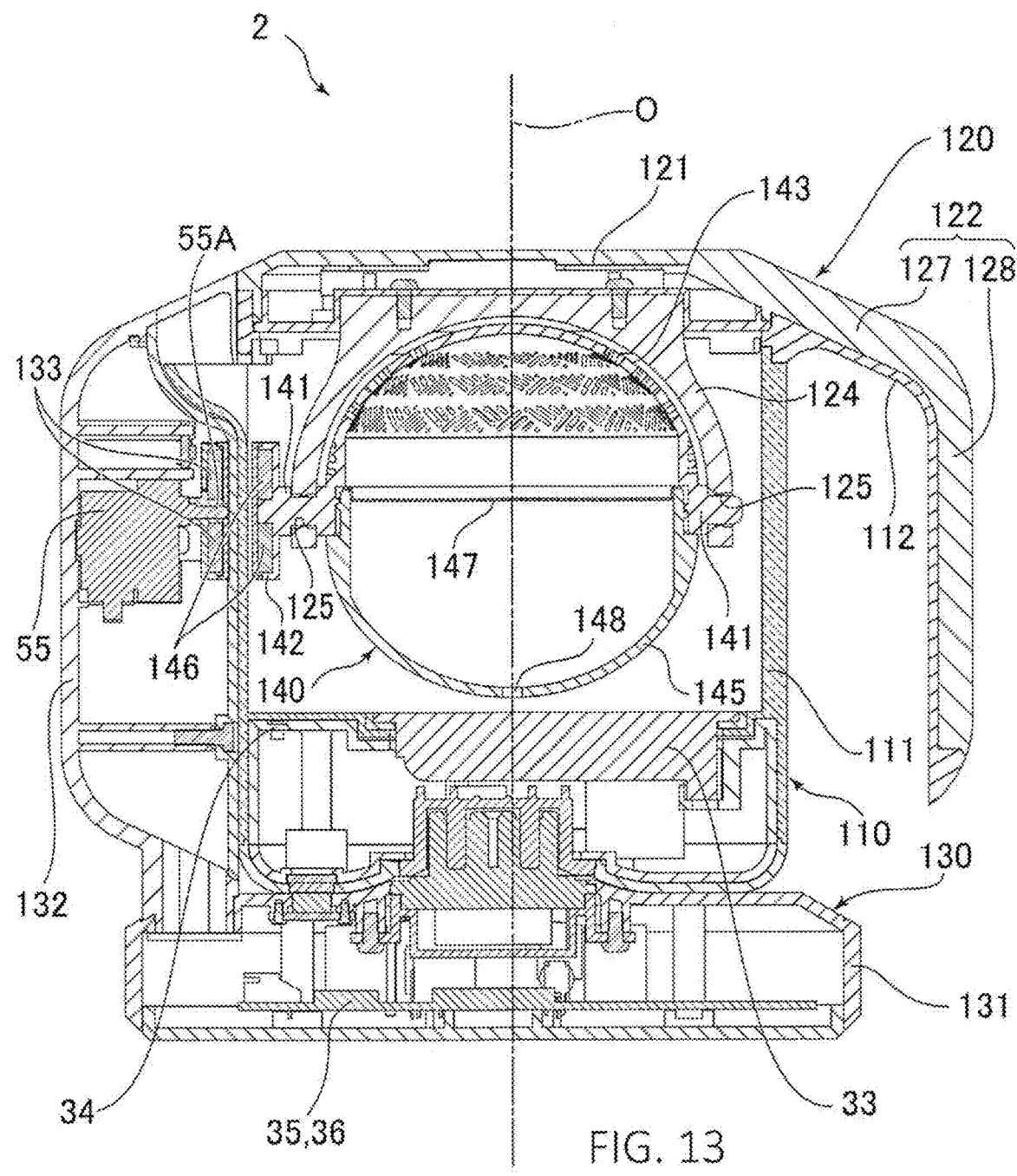
FIG. 13 is a longitudinal cross-sectional view of the beverage extraction apparatus as illustrated in FIG. 11.

FIG. 11 is a perspective view of the beverage extraction apparatus 2 according to the second embodiment. FIG. 12 is an exploded perspective view of the beverage extraction apparatus 2. FIG. 13 is a longitudinal cross-sectional view of the beverage extraction apparatus 2. As shown in FIGS. 11 to 13, the beverage extraction apparatus 2 according to the present embodiment comprises a bottle portion 110 capable of holding a liquid therein, which is supplied from an opening portion located at an upper side thereof, a lid portion 120 for covering the opening portion of the bottle portion 110, and a base portion 130 for allowing the bottle portion 110 to be installed thereon and rotatably holding a base magnet 133 therein.

As shown in FIG. 12, the bottle portion 110 is in a cylindrical shape, as well as comprises a main bottle body 111 capable of holding the liquid and a bottle handle 112 protruding radially outward from the main bottle body 111. Here, a central axis O of the main bottle body 111 extends in the vertical direction. In the following description, a direction orthogonal to the central axis O of the main bottle body 111 in a top view is referred to as a radial direction, and a direction around the central axis O is referred to as a circumferential direction.

An outer peripheral wall of the main bottle body 111 is formed of a material with translucency, such as glass, which allows an inside of the main bottle body to be visible. Therefore, the amount of the contents of the main bottle body 111 can be visually recognized from the outside.

As shown in FIG. 13, a spout is formed at the upper edge portion of the main bottle body 111. An upper surface of the main bottle body 111 can be covered with a lid portion 120. The lid portion 120 comprises a main lid body 121 in a disk shape and a lid handle 122 protruding radially outward from the main lid body 121.

As shown in FIG. 12, at the upper surface of the main lid body 121, an operation portion 123 is provided, which can be operated when the main lid body 121 attached to the main bottle body 111 is removed from the main bottle body 111. Further, the main lid body 121 comprises a holder portion 124 for rotatably holding an infuser 140. The holder portion 124 is fixed at a lower surface of the main lid body 121.

As shown in FIG. 13, the holder portion 124 is in an arc shape. A pair of insertion holes 125 into which rotation shafts 141 of the infuser 140, as described later, is inserted are formed at both ends of the holder portion 124 along the arc. The insertion holes 125 penetrate through the holder portion 124 in the radial direction.

An insertion opening 126 is formed at one end of the holder portion 124 along the arc, and is opened from the inside of the insertion hole 125 toward the outside.

The lid handle 122 comprises a connecting portion 127 projecting radially outward from the main lid body 121, and a gripping portion 128 extending downward from the radial outer end of the connecting portion 127.

A size of the gripping portion 128 in a view of the vertical direction is smaller than that of the main bottle body 111.

The base portion 130 comprises a main body 131 of the base portion for allowing the bottle portion 110 to be installed thereon and an arm portion 132 provided at an outer edge of the main body 131 of the base portion in a standing manner.

In the main body 131 of the base portion, a heater 33 heated by a power supply portion, a temperature sensor 34 for detecting the water temperature in the bottle portion 110 heated by the heater 33, a controlling portion (controller) 35 and a memory portion 36 are provided therein.

As shown in FIG. 13, the base portion 130 rotatably holds the base magnet 133. A base magnet 133 and a motor 55 for rotating the base magnet 133 are disposed within the arm portion 132 of the base portion 130. A driving shaft 55A of the motor 55 extends in a horizontal direction.

In the present embodiment, a pair of permanent magnets is adopted as the base magnets 133. The pair of base magnets 133 is so arranged that both are adjacent to each other in the vertical direction, with the orientations of the respective magnetic poles in an opposite manner. Then, once the driving shaft 55A of the motor 55 rotates, the pair of permanent magnets will so rotate about the driving shaft 55A that their relative positions to each other in the vertical direction are changed.

Figure 14:
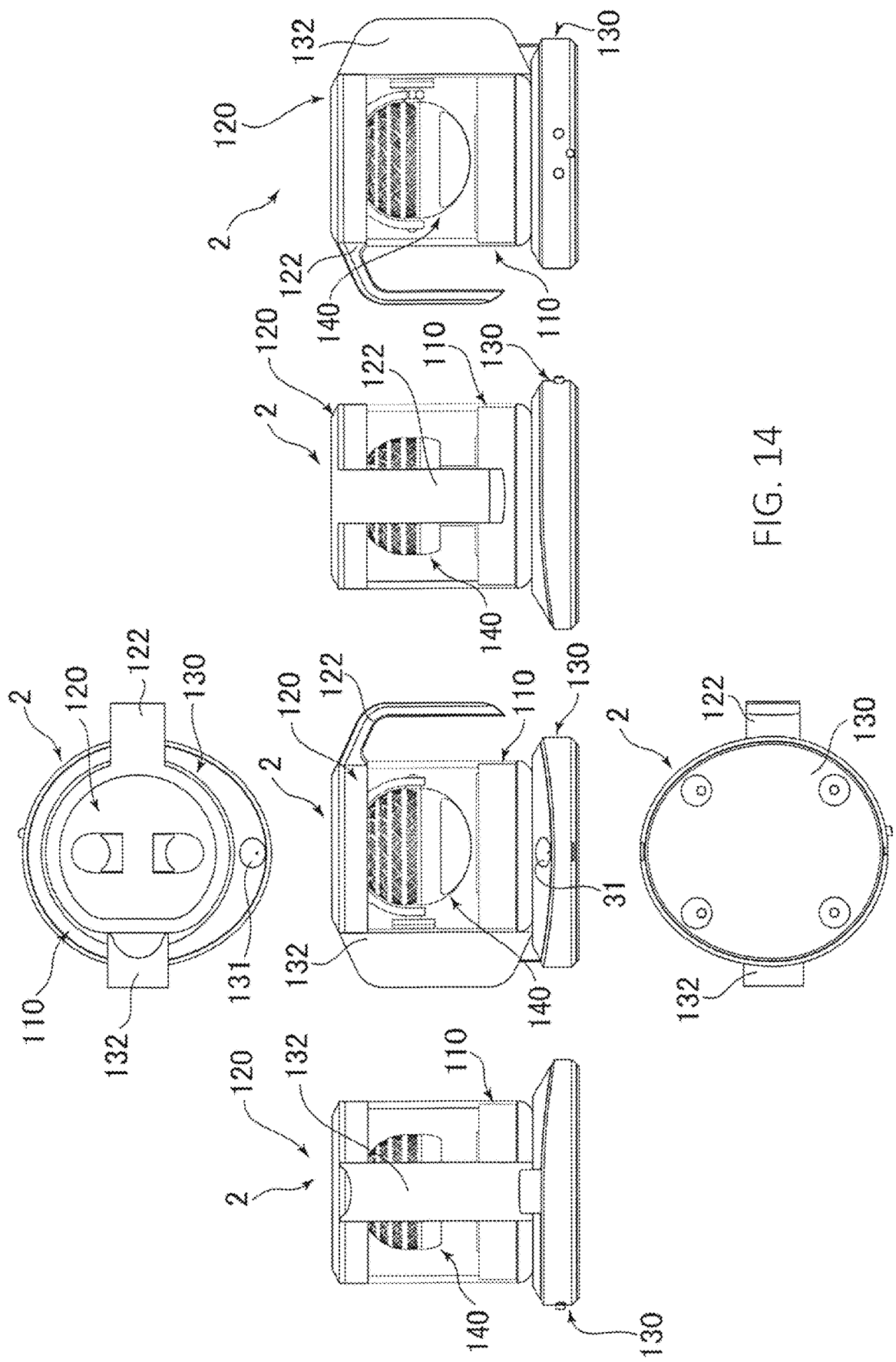
FIG. 14 is a six-view drawing of the beverage extraction apparatus as illustrated in FIG. 11.

FIG. 14 is a six-view drawing of the beverage extraction apparatus 2. As shown in FIG. 14, an arm portion 132 is disposed at an opposite side with respect to the bottle handle 112, both of which radially sandwich the main bottle body 111 in a top view, within the outer edge of the main body 131 of the base portion. The lid handle 122 is not only circumferentially aligned with the bottle handle 112, but also both are vertically overlapped with each other.

As shown in FIG. 13, the infuser 140 is in a substantially spherical shape, as well as, at an outer surface of the infuser 140, a pair of rotation shafts 141 are so configured that the pair of rotation shafts are extended in a horizontal direction and coaxial with each other. The rotation shafts 141 are rotatably held by the holder portion 124 that is fixed at the lid portion 120.

An infuser magnet 146 is disposed at a tip portion of one of the pair of rotation shafts 141. In the present embodiment, a pair of permanent magnets is adopted as the infuser magnets 146.

A magnet case 142 is connected to the tip portion of one of the rotation shafts 141 of the infuser 140. The magnet case 142 is in an oval shape extending in the vertical direction. Within the magnet case 142, a pair of the infuser magnets 146 is disposed at respective sides.

The pair of infuser magnets 146 is so arranged that both are adjacent to each other in the vertical direction, with the orientations of the respective magnetic poles in an opposite manner. Since the orientations of the magnetic poles of the pair of infuser magnets 146 are so opposite to each other in this manner, an initial phase of the pair of infuser magnets 146 can be easily recognized.

Moreover, in a case that such a recognition function of the initial phase is not required, the pair of infuser magnets 146 can be arranged to be adjacent to each other in the vertical direction in a manner of an identical orientations of the magnetic poles.

The pair of infuser magnets 146 is opposite to the pair of base magnets 133 via an interval in the horizontal direction. In the illustrated example, the pair of infuser magnets 146 and the pair of base magnets 133 are arranged horizontally adjacent to each other via an outer peripheral wall of the bottle body 111 and an outer wall of the arm portion 132.

Regarding the pair of infuser magnets 146 and the pair of base magnets 133, which are opposite to each other in the horizontal direction, both are attracted to each other by their magnetic forces.

Therefore, when the base magnets 133 rotates around the driving shaft 55A of the motor 55, the infuser magnets 146 will rotate around the driving shaft 55A in synchronization with the base magnets 133. As a result, the vertical direction of the infuser 140 is reversed.

Figure 15:
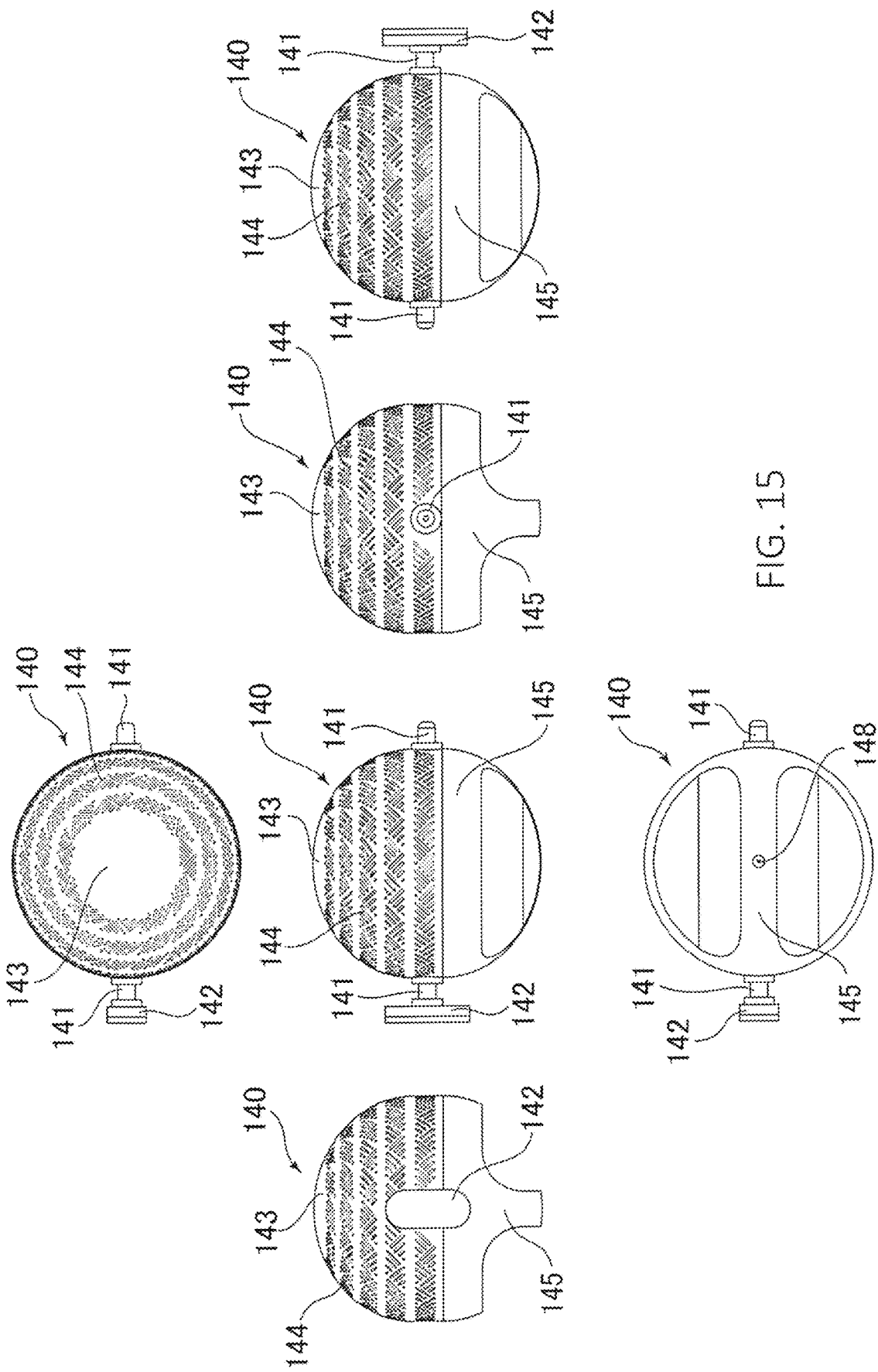
FIG. 15 is a six-view drawing of the infuser as illustrated in FIG. 11.

FIG. 15 is a six-view drawing of the infuser 140. As shown in FIG. 15, in the present embodiment, a plurality of mesh-like orifice portions 144 are formed in a first outer surface 143 of the infuser 140. The plurality of orifice portions 144 are formed, except of a top portion of the first outer surface 143, throughout the first outer surface 143.

As shown in FIG. 12, the infuser 140 further comprises a mesh-like inner plate 147 located within internal portion of the infuser 140, for separating an inner side of the first outer surface 143 from an inner side of the second outer surface 145.

The inner plate 147 is in a circular shape in a plan view, and meshes are formed throughout the same. Thus, the inner plate 147 restricts tea leaves from passing through the inner plate 147 while allowing the liquid to pass through the inner plate 147.

At the bottom of the second outer surface 145 of the infuser 140, a through hole 148 is formed. Therefore, the liquid can flow from the through hole 148 into the inside of the second outer surface 145 (see FIG. 17(a)).

The controlling portion 35 controls the magnetic poles of the base magnets 133 such that the first outer surface 143 will be in a downward manner when allowing inflow and outflow of the liquid with regard to the internal portion of the infuser 140 and the bottle portion 110 therein. In the present embodiment, the controlling portion 35 controls the magnetic poles of the base magnets 133 via causing the positions of the base magnets 133 to change.

Figure 16:
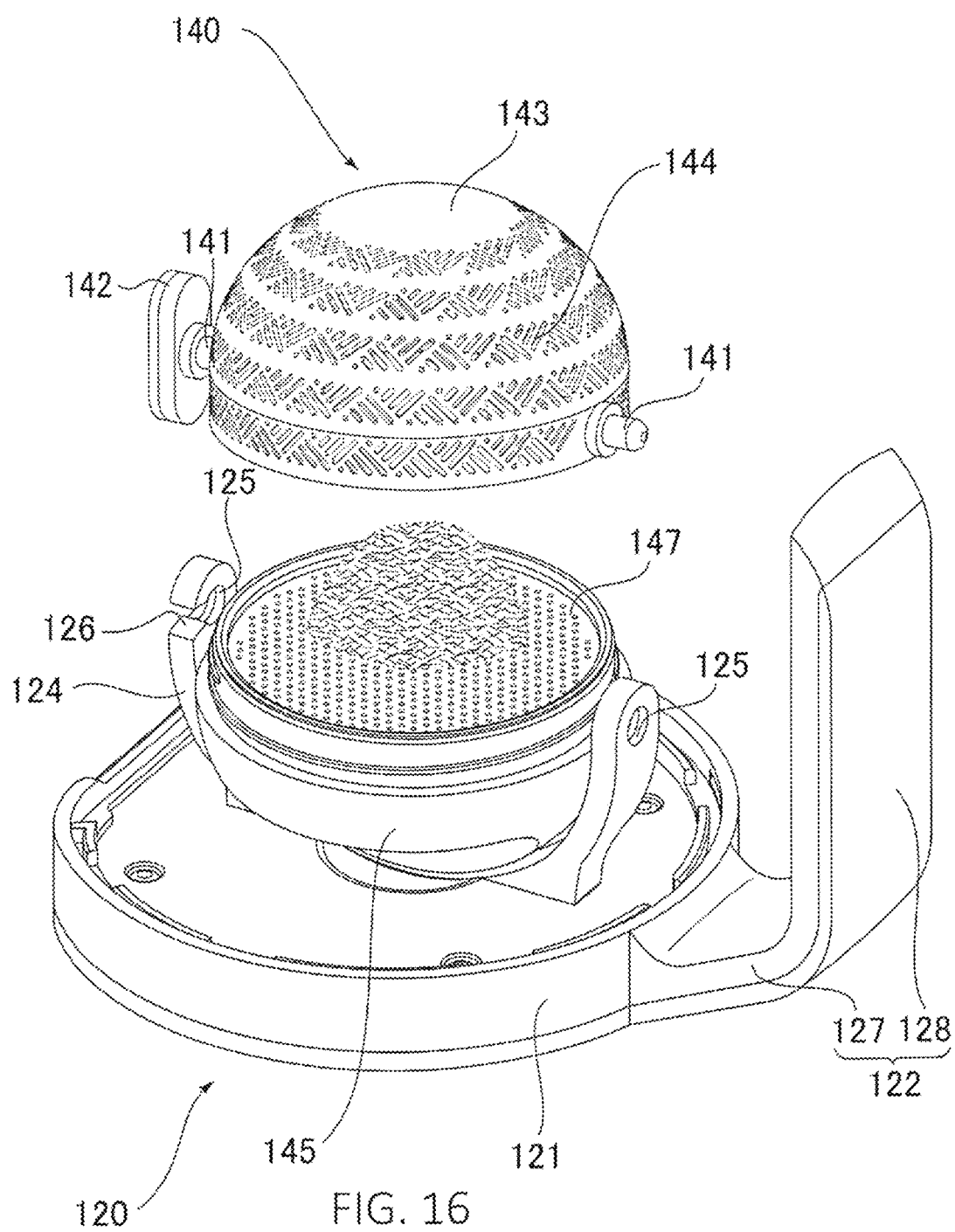
FIG. 16 is a perspective view which illustrates a status of tea leaves being set in the infuser as illustrated in FIG. 11.
Figure 17:
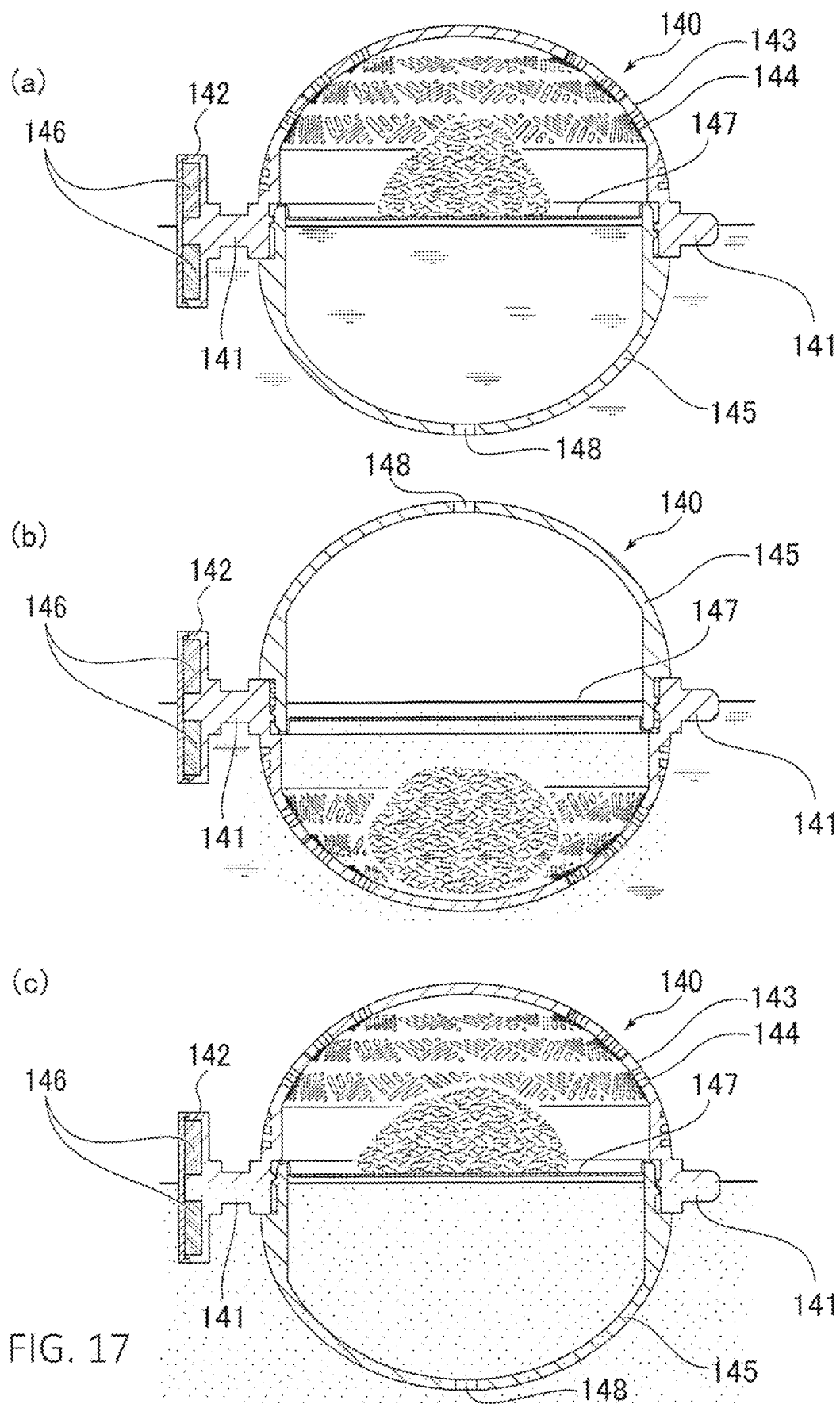
FIG. 17 is a drawing which illustrates a condition the infuser as illustrated in FIG. 11 is rotated and the tea leaves are extracted.
Figure 18:
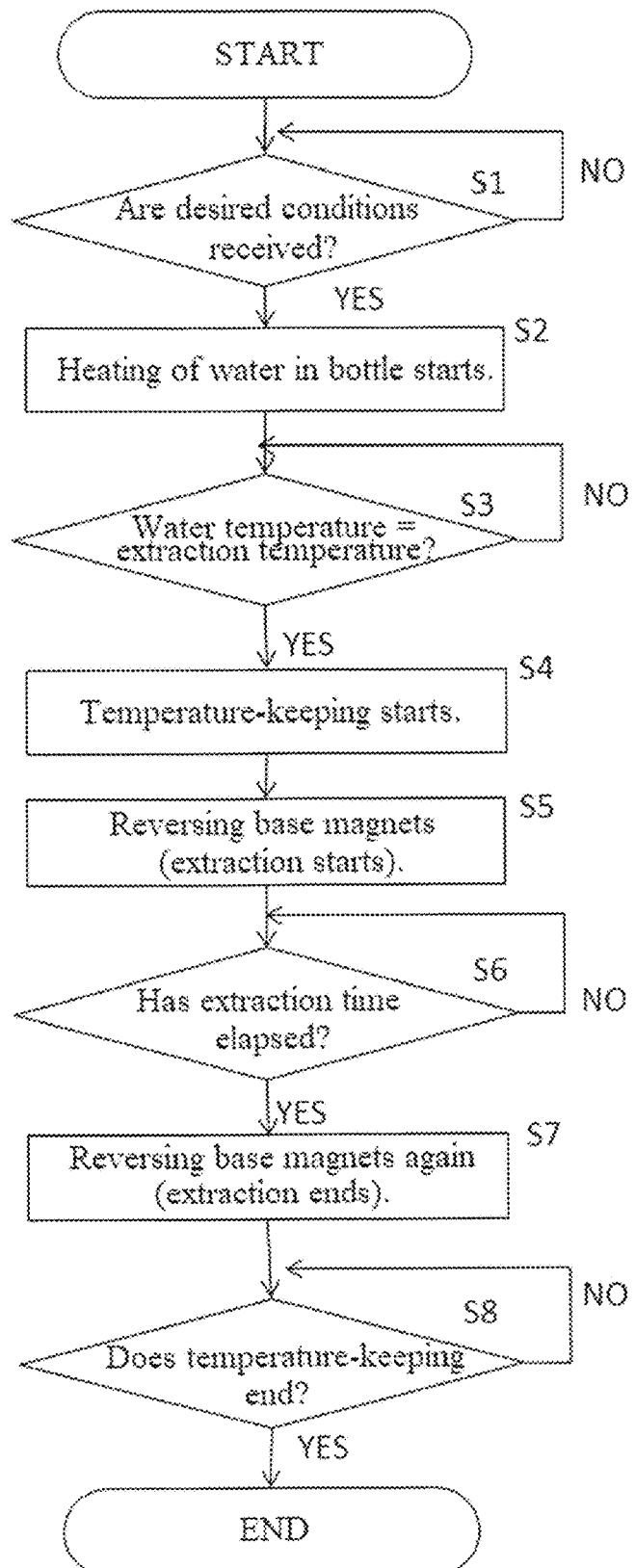
FIG. 18 is a flow chart which illustrates an extraction routine as an operation of the beverage extraction apparatus via controlling portion as disclosed in the second embodiment.

This will be described in detail with reference to FIGS. 16 to 18, in accompany with descriptions of filling of the tea leaves in the internal portion of the infuser 140 and the operations of the infuser 140 in the extraction of the tea leaves. FIG. 16 is a perspective view which illustrates a status of tea leaves being set in the infuser 140. FIG. 17 is a drawing which illustrates a condition the infuser 140 is rotated and the tea leaves are extracted. FIG. 18 is a flow chart which illustrates an extraction routine as an operation of the beverage extraction apparatus 2 via the controlling portion 35 as disclosed in the second embodiment.

Moreover, in FIG. 17, the components, other than the infuser 140, are omitted for an easily diagram-viewing.

As shown in FIG. 16, the first outer surface 143 and the second outer surface 145 are installed with the tea leaves placed on the inner plate 147 of the infuser 140. Then, the rotation shafts 141 of the infuser 140 are inserted into the holder portion 124 of the lid portion 120.

At this time, under a situation that one of the pair of rotating shafts 141, to which is the magnet case 142 is not connected, is penetrated through the insertion hole 125 of the holder portion 124, the other one of the pair of rotating shafts 141, to which the magnet case 142 is connected, will be inserted thereinto via the insertion opening 126 of the holder portion 124.

As a result, the lid portion 120 rotatably holds the infuser 140. Then, the lid portion 120 is attached to the bottle portion 110 which is filled with the water. Then, S1 to S4, as depicted in the control flow shown in FIG. 18, are executed.

Next, starting from a state as shown in FIG. 17(a), in S5, the motor 55 is driven under the control of the control unit 35 so as to vertically reverse the infuser 140 (see FIG. 17(b)).

As a result, the tea leaves fall to the inner side of the first outer surface 143 of the infuser 140 from the upper surface of the inner plate 147, and are immersed in the water so as to allow the tea leaves to be extracted. The extracted liquid will pass through the orifice portions 144 and fulfill throughout the main bottle body 111.

The controlling portion 35 repeats the process of S6 until the extraction time included in the extraction conditions has elapsed (in the case that S6 is NO). When the extraction time included in the extraction condition has elapsed (in the case that S6 is YES), the controlling portion 35 will execute the process of S7.

Then, in S7, once the extraction of the tea leaves is completed, the motor 55 will be driven again, under the control of the control unit 35, so as to allow the infuser 140 to be reversed again (FIG. 17(*c*)). As a result, the tea leaves will be placed on the upper surface of the inner plate 147, and the extraction is completed. Then, the process proceeds to S8.

As described as above, in the beverage extraction apparatus 2 according to the present embodiment, the base portion 130 comprises the arm portion 132 provided at an outer edge of the main body 131 of the base portion in a standing manner, and the base magnet 133 is disposed within the arm portion 132.

Therefore, it will be possible to arrange the base magnet 133 at a position horizontally adjacent to the infuser 140. Then, by arranging the infuser magnets 146 at a position opposite to the base magnets 133 in the horizontal direction, even if a diameter of the infuser 140 is increased, a distance between the infuser magnets 146 and the base magnets 133 can be suppressed from increasing regardless of a rotational attitude of the infuser 140. Thus, the infuser 140 can be surely reversed by the base magnets 133.

As a result, the diameter of the infuser 140 can be increased as compared with the configuration in which the base magnets 133 are disposed within the main body 131 of the base portion, and a quality of the extraction of tea leaves by the beverage extraction apparatus 2 can be improved as a space in the infuser 140 can be ensured in which the tea leaves will expand when tea leaves are extracted.

Further, as compared with the configuration in which the base magnets 133 are disposed within the main body 131 of the base portion, it will be possible to ensure a larger volume for the heater 33 occupying internal portions of the base magnets 133, thereby ensuring a feasibility of manufacturing.

Further, the spherical infuser 140 is provided with the pair of rotation shafts 141, which are held by the holder portion 124 that is fixed at the lid portion 120. Therefore, it will be possible to detach the lid portion 120 as well as the infuser 140 from the main bottle body 111 at the same time, thereby ensuring a handablility of the infuser 140.

Further, for example, in comparison with the configuration in which the portion for holding the infuser 140 is provided within the main bottle body 111, the structure of the main bottle body 111 will thus be simplified so as to ensure a larger volume of in the main bottle body 111.

Further, due to forming of the rotation shafts 141 at the outer surface of the infuser 140, the formability of the infuser 140 will be ensured as compared with the configuration in which the concave portions are formed at the outer surface of the infuser 140.

Further, the infuser magnets 146 are disposed in either one of the pair of rotation shafts 141. Therefore, a distance between the base magnets 133 and the infuser magnets 146 can be shortened as compared with the configuration in which the infuser magnets 146 are provided within the infuser 140.

Thus, by utilizing the base magnets 133 and the infuser magnets 146, a smooth reversing operation of the infuser 140 will be achieved.

Further, the infuser 140 comprises the first outer surface 143 and the second outer surface 145, and the controller controls the magnetic poles of the base magnets 133 so as to allow the first outer surface 143 to be in a downward manner, when allowing inflow and outflow of the liquid with regard to the internal portion of the infuser 140 and the bottle portion 110 therein.

Therefore, when the first outer surface 143 configured with the orifice portions 144 is in an upward manner such that inflow and outflow of the liquid with regard to the internal portion of the infuser 140 and the bottle portion 110 therein are blocked, the extraction of tea leaves will be stopped as the first outer surface 143 is allowed to be in an upward manner.

Further, the infuser 140 comprises the inner plate 147 located within the internal portion of the infuser 140, for separating an inner side of the first outer surface 143 from an inner side of the second outer surface 145.

Therefore, it will be possible to prevent the tea leaves from being stirred in the infuser 140 excessively, thereby a smooth extraction of the tea leaves can be achieved.

Further, the arm portion 132 is disposed at an opposite side with respect to the bottle handle 112, both of which radially sandwich the main bottle body 111 in a top view, within the outer edge of the main body 131 of the base portion. Therefore, an overlap between the arm portion 132 and the bottle handle 112 can be suppressed, and the appearance of the beverage extraction apparatus 2 can be improved.

Further, since the lid handle 122 of the lid portion 120 is not only circumferentially aligned with the bottle handle 112, but also both are vertically overlapped with each other, a bulkiness of the lid handle 122 and the bottle handle 112 can be so reduced as to achieve a compact configuration.

Although the embodiments of the present invention have been described with reference to the drawings, the specific configuration is not limited to such embodiments.

For example, in each of the above-described embodiments, although the bottle portions 10 and 110 are in cylindrical structures, it is not merely limited to such aspects. The bottle portions 10 and 110 can be, for example, in angular cylindrical shapes.

Further, in the above-described second embodiment, although the structure in which the rotation shafts 141 are formed at the outer surface of the infuser 140 has been depicted, it is not merely limited to such aspects. The pair of rotation shafts 141 projecting toward the infuser 140 can be formed at respective ends of an arc of the holder portion 124, and insertion concave portions into which the rotary shafts 141 are inserted can be formed at the outer surface of the infuser 140.

Further, various modifications are also included without departing from the spirit and scope of the present invention. Moreover, the configurations in the foregoing embodiments may be appropriately combined.

REFERENCE SIGNS LIST

1 and 2 beverage extraction apparatus
10 and 110 bottle portion
20 and 120 lid portion
30 and 130 base portion
32 and 133 base magnet
40 and 141 infuser 43 and 143 first outer surface
44 and 144 orifice portions
45 and 145 second outer surface
46 and 146 infuser magnet
47 blocking mechanism
131 main body of base portion
132 arm portion
147 inner plate

The invention claimed is:

1. A beverage extraction apparatus comprising:
 a bottle portion configured to hold a liquid therein, the liquid supplied from an opening portion located at an upper side of the bottle portion;
 a lid configured to cover the opening portion of the bottle portion;
 a base portion configured to allow the bottle portion to be installed thereon and rotatably hold a base magnet therein;
 a motor configured to rotate the base magnet;
 an infuser including a first outer surface configured with a plurality of orifices to allow inflow and outflow of the liquid with regard to an internal portion of the infuser and the bottle portion therein, and a second outer surface configured to block the inflow and outflow of the liquid with regard to the internal portion of the infuser and the bottle portion therein;
 an infuser magnet on a side surface of the infuser when the infuser is oriented in a vertical direction, the base magnet configured to rotate the infuser magnet by magnetic force in response to rotation of the base magnet, and the infuser magnet configured to reverse upside down within the bottle portion in response to rotation of the infuser magnet; and
 a controller configured to control a magnetic pole of the base magnet to facilitate orientation of the first outer surface in a downward manner when allowing the inflow and outflow of the liquid with regard to the internal portion of the infuser and the bottle portion therein, and to control the magnetic pole of the base magnet to facilitate orientation of the second outer surface in a downward manner when blocking the inflow and outflow of the liquid with regard to the internal portion of the infuser and the bottle portion therein.

2. The beverage extraction apparatus according to claim 1, wherein
 the base portion comprises a main body for allowing the bottle portion to be installed thereon, and an arm portion at an outer edge of the main body of the base portion in a standing manner, and
 the base magnet, which is within the arm portion, is opposite to the infuser magnet.

3. The beverage extraction apparatus according to claim 2, wherein
 the infuser has a substantially spherical shape,
 the lid comprises a holder portion for rotatably holding the infuser, and
 at one of the infuser and the holder portion, a pair of rotation shafts extend in a horizontal direction and are coaxial with each other.

4. The beverage extraction apparatus according to claim 3, wherein
 the pair of rotation shafts are at an outer surface of the infuser, and
 at the holder portion, insertion holes are configured in a pair to allow the pair of rotation shafts to be inserted thereinto.

5. The beverage extraction apparatus according to claim 4, wherein the infuser magnet is in either one of the pair of rotation shafts.

6. The beverage extraction apparatus according to claim 1, wherein the infuser comprises a mesh-like inner plate within the internal portion of the infuser, for separating an inner side of the first outer surface from an inner side of the second outer surface.

7. The beverage extraction apparatus according to claim 2, wherein
 the bottle portion comprises a main bottle body having a cylindrical shape, and a bottle handle protruding radially outward from the main bottle body, and
 the arm portion is at an opposite side with respect to the bottle handle, both of which radially sandwich the main bottle body in a top view, within the outer edge of the main body of the base portion.

8. The beverage extraction apparatus according to claim 7, wherein
 the lid comprises a main lid body having a disk shape, and a lid handle protruding radially outward from the main lid body, and
 the lid handle is circumferentially aligned with the bottle handle, and the lid handle and the bottle handle are vertically overlapped with each other.

9. The beverage extraction apparatus according to claim 1, wherein the infuser includes a blocking mechanism for blocking the inflow and outflow of the liquid with regard to the bottle portion therein when the orifices are in a downward manner.

10. The beverage extraction apparatus according to claim 1, wherein
 the infuser magnet is in the infuser at an area of the first outer surface, and
 the controller is configured to only control the magnetic pole of the base magnet when allowing the inflow and outflow of the liquid with regard to the internal portion of the infuser and the bottle portion therein.

* * * * *